US009705941B2

(12) United States Patent
Remash et al.

(10) Patent No.: US 9,705,941 B2
(45) Date of Patent: Jul. 11, 2017

(54) SEAMLESS MOVEMENT OF ACTIVE MEDIA SESSIONS BETWEEN TWINNED COMMUNICATION DEVICES

(71) Applicant: AT&T Intellectual Property I, L.P., Atlanta, GA (US)

(72) Inventors: Alek Remash, Chester, NJ (US); Michael D. Cercena, Hockessin, DE (US); Vincent De Gennaro, Chappaqua, NY (US); Stephanie Parlamas, Colts Neck, NJ (US); Vimal Patel, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 228 days.

(21) Appl. No.: 14/553,425

(22) Filed: Nov. 25, 2014

(65) Prior Publication Data

US 2016/0149966 A1  May 26, 2016

(51) Int. Cl.
*H04L 12/16* (2006.01)
*H04L 29/06* (2006.01)

(52) U.S. Cl.
CPC ...... *H04L 65/1096* (2013.01); *H04L 65/1006* (2013.01); *H04L 65/1083* (2013.01); *H04L 65/40* (2013.01)

(58) Field of Classification Search
CPC ............... H04M 7/127; H04L 29/0619; H04L 29/06231; H04L 29/06251; H04L 29/06272; H04L 29/06278; H04L 29/06306; H04L 29/08576; H04L 29/08306; H04W 76/005; H04W 76/025; H04W 76/028; H04W 76/064
See application file for complete search history.

(56) References Cited

U.S. PATENT DOCUMENTS 8,396,460 B2   3/2013   Couse
8,630,632 B2   1/2014   Cormier et al.
8,638,917 B2   1/2014   Jano
8,781,089 B2   7/2014   Gilboa et al.
(Continued)

OTHER PUBLICATIONS

"ACCESSION™ IMT & IMX", Metaswitch, (2012).
(Continued)

*Primary Examiner* — Alvin Zhu
(74) *Attorney, Agent, or Firm* — Amin, Turocy & Watson, LLP

(57) ABSTRACT

A softphone application is provided that facilitates device switching between devices twinned therewith. In an aspect, a first device employing the softphone application generates a request to switch a media session between a second device and a third device to be between the first device and the third device and the softphone application sends, the request to an application server device associated with a cellular service provider identity. The request comprises a first identifier for the first device, a second identifier for the second device, and a device switch indicator. The request is configured to initiate a switch of the media session to being between the first device and the third device based on a determination that the first device and the second device are associated with a common mobile subscriber identity registered for an account associated with the cellular service provider identity.

20 Claims, 22 Drawing Sheets

(56) References Cited

U.S. PATENT DOCUMENTS

| | | | |
|---|---|---|---|
| 8,817,963 | B2 | 8/2014 | Makhmudov et al. |
| 9,131,056 | B1* | 9/2015 | Chen ................. H04W 36/0011 |
| 9,288,035 | B2* | 3/2016 | Johnson .............. H04L 65/4061 |
| 2009/0129371 | A1 | 5/2009 | Bishay |
| 2009/0290698 | A1 | 11/2009 | Lundgren et al. |
| 2010/0220634 | A1 | 9/2010 | Gisby et al. |
| 2011/0021200 | A1* | 1/2011 | Yi ....................... H04L 65/1016 455/442 |
| 2011/0029682 | A1 | 2/2011 | Waters |
| 2012/0039448 | A1* | 2/2012 | Poi .......................... H04M 3/24 379/26.01 |
| 2012/0323703 | A1 | 12/2012 | Hillier |
| 2013/0223432 | A1 | 8/2013 | Cook |
| 2014/0334441 | A1* | 11/2014 | Macalet ............ H04W 36/0022 370/331 |

OTHER PUBLICATIONS

Lin, et al. "Single Sign-On for Unified Communications", International Journal of Intelligent Computing Research, vol. 3, Issues 1/2, (Mar./Jun. 2012) pp. 269-276.

\* cited by examiner

SIP Messaging for Device Switch

| Softphone A signals a ... | | of this type of call ... | from ... | to ... | by using a SIP ... | containing the ... |
|---|---|---|---|---|---|---|
| Push | 201 | Active | Softphone A | Handset | REFER | MSISDN |
| Push | 202 | Active | Softphone A | Softphone B | REFER | GRUU of Softphone B |
| Pull | 203 | Active | Softphone B | Softphone A | INVITE | R-URI for a Softphone DS: pull-SP-active@one.att.net |
| Pull | 204 | Active | Handset | Softphone A | INVITE | R-URI for a Handset DS: pull-VoLTE-active@one.att.net |
| Pull | 205 | On Hold | Handset | Softphone A | INVITE | R-URI for a Handset DS: pull-VoLTE-hold@one.att.net |

FIG. 2

SEAMLESS MOVEMENT OF ACTIVE MEDIA SESSIONS BETWEEN TWINNED COMMUNICATION DEVICES

TECHNICAL FIELD

The subject disclosure relates to wireless communications, e.g., to seamless movement of active media sessions between twinned communication devices.

BACKGROUND

A softphone (software telephone) is an application program that enables voice over Internet Protocol (VoIP) telephone and video calls from computing devices. Existing softphones are generally not as universal or ubiquitous as traditional phone service (e.g., landline and/or mobile) since they require separate accounts and require both user endpoints to have compatible softphones. However, softphones provide various benefits over traditional phone service. For example, softphones use existing Internet bandwidth and do not require any dedicated connection for voice communication. Since a softphone does not require a dedicated channel, it uses bandwidth efficiently. As a result, softphones generally provide users with a low cost means for voice calling, especially international calling. Accordingly, users will often employ both traditional phone service and softphones to meet their communication needs.

Without the seamless integration of mobile phones and softphones, when switching between devices after a call has already been initiated, users have to end the call on their initial device and then restart the call on their second device. For example, when a user switches a call established with another person from her mobile phone to her softphone, or vice versa, the user will either have to call back the other person with whom she was speaking on her second device or ask the other person to call her back on the second device, often using a different phone number or user name/address for their second device. Manual switching between devices in the middle of a call is inconvenient for the users and disruptive to their conversations.

BRIEF DESCRIPTION OF THE DRAWINGS

FIG. 2 provides a chart outlining SIP messaging for device switch in accordance with aspects and embodiments described herein;

DETAILED DESCRIPTION

Figure 1:
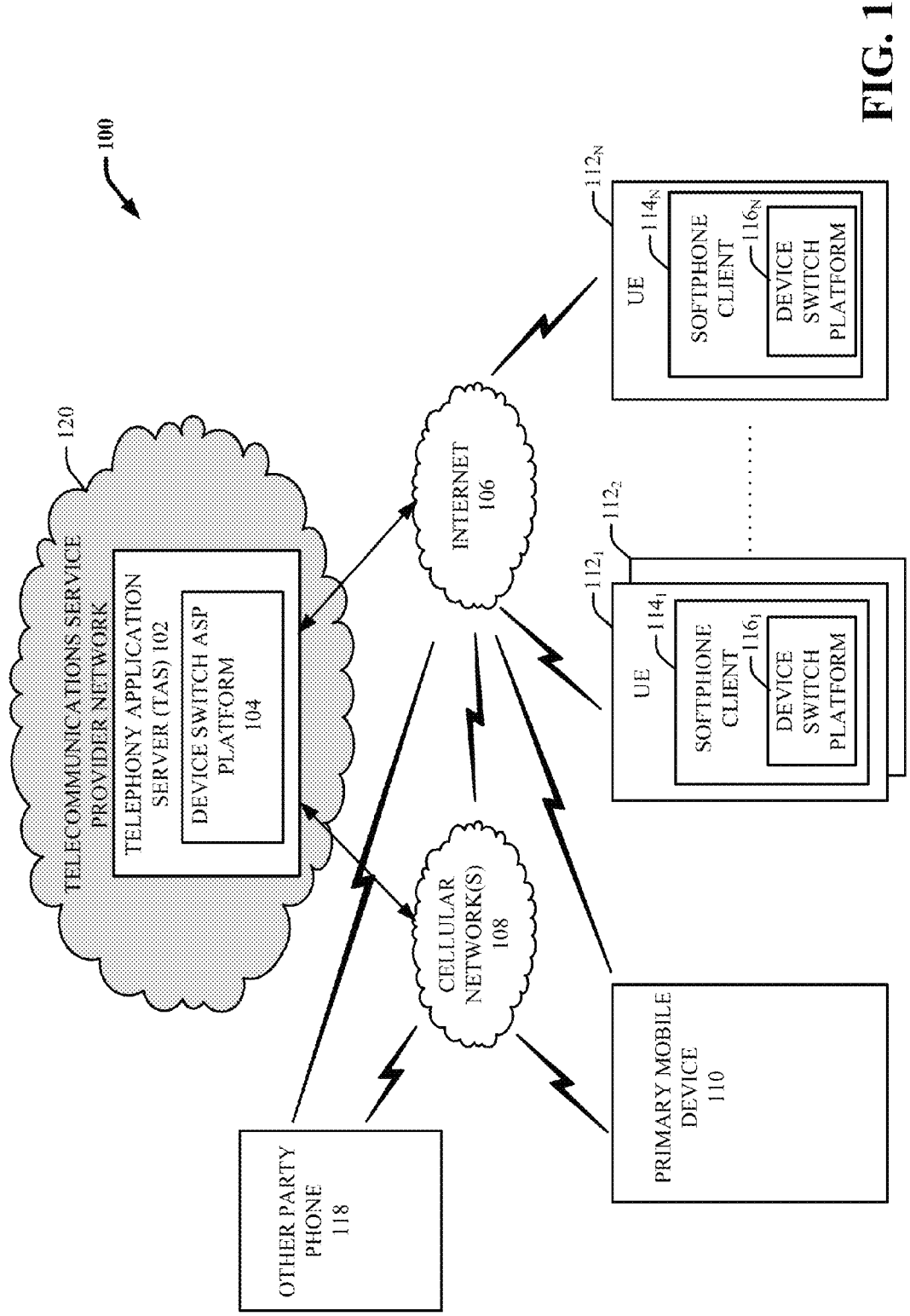
FIG. 1 illustrates an example system that provides seamless movement of active media sessions between twinned communication devices in accordance with aspects and embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "server," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component.

One or more components may reside within a process and/or thread of execution and a component may be localized on one computer and/or distributed between two or more computers. As another example, an interface can include input/output (I/O) components as well as associated processor, application, and/or application program interface (API) components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," "mobile equipment," "wearable device," "primary device," secondary device," "subscriber device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The subject disclosure is directed to systems and method that solve the problem of switching an active voice or video session between a mobile phone and a softphone in mid-session. In accordance with the disclosed subject matter, a telecommunications service provider that provides both cellular/mobile telephone service and softphone service to customers allows a user to employ both services in association with a single subscriber account. In particular, in association with registration for mobile/cellular phone service with the telecommunications service provider, a user receives a mobile telephone/subscriber number that is assigned to the user's account and primary mobile device, such as the user's smartphone. This mobile telephone/subscriber number, also referred to as the mobile station international subscriber directory number (MSISDN), is used to identify the mobile/cellular subscriber in association with wireless communications.

In addition to registration for cellular/mobile service, the user can also register for softphone based services with the telecommunications service provider. For example, the user can install a softphone client application of the telecommunication service provider onto a suitable computing device employed by the user (e.g., a laptop personal computer, a tablet personal computer, a desktop computer, etc. configured to communicate with other devices using Internet protocol), wherein the telecommunications service provider is configured to provide the softphone service associated with usage of the softphone client. Rather than establishing a separate account for the softphone client and associating a different phone number with the softphone client, the telecommunications service provider allows the user to share the same or primary mobile telephone/subscriber number (e.g., share the same MSISDN). This functionality is referred to herein as "twinning."

As used herein, the term "twinning" refers to usage of a primary identifier (e.g., MSISDN or mobile telephone number) to share voice, video and/or text messages and on multiple communication devices associated with their subscriber account. As an example, the primary identifier can be an identifier (e.g., customer telephone number (CTN)) of a user's primary mobile device or can be a common identifier (e.g., a mobile one number (MON)) assigned to multiple secondary devices associated with the user's subscriber account. From the user perspective, when a call is made from any one of the twinned devices (e.g., including a registered softphone client and the user's primary mobile device), the call is represented by the same user identity (e.g., the same phone number or user identity tied to the phone number).

In an aspect, the telecommunications service provider can allow a mobile subscriber to have a plurality of twinned softphone clients registered for softphone services with the telecommunications service provider. For example, the user can employ a softphone client on her desktop personal computer at work, a softphone client on her home personal computer, a softphone client on her tablet, etc., wherein each of the devices share the same mobile subscriber/telephone number. In an aspect, the telecommunications service provider can allow the user to have any number of twinned softphone clients. However, in other aspects, the telecommunications service provider can restrict the number of devices a user is allowed to have twinned to the same user account. For example, the telecommunications service provider can allow a mobile subscriber to have up to five twinned softphone clients.

In association with softphone client and primary mobile device twinning, the subject disclosure provides a mechanism for enabling the movement of active or on hold, voice and/or video (video assumes active voice and video) sessions between any one of a user's twinned device. In particular, mechanisms are provided for switching an active voice or video call from a user's main smartphone to one of the user's twinned softphone clients and vice versa, or for switching active voice and video sessions from one of the user's twinned softphone clients to another one of the user's twinned softphone clients. These mechanisms for moving active or on hold media sessions between a user's twinned devices are referred to herein as device switching. The subject device switch mechanisms hand off a voice or video call in its active state (voice or video) and move the call to a twinned device using the existing access method, (e.g., radio access network (RAN) or Wireless Fidelity (WiFi)), of the twinned device.

For example, assume a mobile subscriber named Anne is conducting a voice call on her mobile phone with her friend Bob as she is driving home from work. When Anne gets home and moves into her house, Anne may desire to switch the call from her mobile phone to her tablet softphone client that is twinned to her mobile phone. Using the mechanisms described herein, Anne can employ her softphone client to request the call be moved to her softphone client as the call is in progress. In other words, Anne can request her end of the to be call is transferred from her mobile device to her softphone client without interruption to the call. The request is received and processed by an intelligent application server of the telecommunications service provider which identifies the initial call in progress between Anne's mobile phone and Bob's device, determines that both Anne's mobile phone and the softphone client are twinned and interprets the request as a request to pull the call from Anne's mobile phone to her softphone client. The intelligent application server then facilitates switching the call from between Anne's mobile phone and Bob's device to be between Anne's softphone and Bob's device (e.g., using traditional session initiation protocol (SIP) signaling) without interruption to the call.

Referring initially to FIG. 1, illustrated is an example system 100 that provides seamless movement of active media sessions between twinned communication devices in accordance with aspects and embodiments described herein. System 100 includes a telecommunications/cellular service provider network 120 of a telecommunications service provider identity. The telecommunications/cellular service provider can be configured to provide various wireless communication services to users, including multimedia communications (e.g., voice and video) using substantially any wired or wireless communication technology, including but not limited to: Public Switched Telephone Network (PSTN), Universal Mobile Telecommunications System (UMTS), Global System for Mobile Communications (GSM), WiFi, Worldwide Interoperability for Microwave Access (WiMAX), General Packet Radio Service (GPRS), Enhanced GPRS, Third or Fourth Generation Partnership Project (3GPP of 4GPP) Long Term Evolution (LTE), Voice Over Long Term Evolution (VoLTE), Voice Over Internet Protocol (VoIP), Third Generation Partnership Project 2 (3GPP2) Ultra Mobile Broadband (UMB), High Speed Packet Access (HSPA), ZigBee, or another IEEE 802.XX technology. Additionally, substantially all aspects of the disclosed subject matter can be exploited in legacy (e.g., wireline) telecommunication technologies and/or future telecommunication technologies (e.g., 5G, whitespace, etc.).

System 100 further includes a user's primary mobile device 110 (e.g., a smartphone or a mobile phone) that is registered with the telecommunications service provider identity of the telecommunications service provider network 120 to receive wireless communication services therefrom via one or more cellular networks 108 employed by the telecommunications service provider (e.g., 2G/3G/4G LTE, VoLTE etc.) in association with a user/subscriber account established by the user with the telecommunications service provider. In an aspect, primary mobile device 110 includes the capability to establish voice and video communication sessions using Internet protocol based communication networks associated with the telecommunications service provider. In an exemplary embodiment, cellular networks(s) 108 includes a VoLTE network and primary mobile device 110 is registered (in association with the user/subscriber account) and configured to receive VoLTE services provided by the telecommunications service provider network 120 in association with an IP multimedia subsystem or IP multimedia core network subsystem (IMS) of the telecommunications service provider network 120. IMS is an architectural framework for delivering IP multimedia services. In an aspect, IMS is required for provision of VoLTE services. According to this embodiment, a user/subscriber of the primary mobile device can register to receive VoLTE voice (IR92) and/or video (IR94) service provided by the telecommunications service provider in association with the user/subscriber account. In an aspect, the device switching mechanisms described herein are only available for VoLTE subscribers with VoLTE voice (IR92) and/or video (IR94) service.

System 100 also and includes one or more user equipment (UEs) devices $112_1$-$112_N$ (wherein N is most any integer) associated with (e.g., owned by, leased by, rented by, used by, etc.) the primary mobile device subscriber. As an example, the UEs $112_1$-$112_N$ can include a computing device configured to communicate with other devices via the Internet 106 using IP based connectivity, such as, but not limited to, a tablet computer, a mobile phone, a personal computer, a personal digital assistant (PDA), a laptop, a wearable device (e.g., smart watch, smart glasses, activity/fitness tracker, etc.), a digital media player, a digital camera, a content streaming player/dongle, a digital set-top box, a gaming system, etc.

Each of the respective UEs $112_1$-$112_N$ include softphone clients $114_1$-$114_N$ that have been registered by the user of the primary mobile device 110 with the telecommunications service provider to receive softphonebased services therefrom (e.g., VoIP based voice and video communications sessions). In accordance with the device switching mechanisms described herein, the respective softphone clients $114_1$-$114_N$ (or up to a restricted number of the softphone clients, such as five) are twinned with the subscriber's primary mobile device 110. In particular, one or more of the respective softphone clients $114_1$-$114_N$ have been registered and authorized for softphone based services from the telecommunications service provider under the same user/subscriber account established by the user for user's primary mobile device 110. For example, each of the twinned softphone clients $114_1$-$114_N$ can be associated with the same mobile telephone number (e.g., MSISDN) assigned to the primary mobile device 110 in association with the user's mobile service account established with the telecommunications service provider. In association with the twinning procedure, the primary mobile device 110 subscriber can register the respective softphone clients $114_1$-$114_N$ to be twinned with the one another under the user's primary mobile device identity (e.g., MSISDN) by authenticating his or her primary mobile device 110 identity and user account. Upon authentication and twinning registration, the telecommunications service provider network 120 stores information associating the primary mobile device 110 and the registered softphone clients $114_1$-$114_N$ with the shared mobile subscriber identity (e.g., the shared phone number or MSISDN).

In an aspect, each of the softphone clients $114_1$-$114_N$ are assigned unique names or identifiers that distinguish the respective softphone clients. These unique names or identifiers are associated with or tied to the primary mobile device 110 identifier (e.g., the MSISDN of the primary mobile device) in a data store accessible to a telephony application server (TAS) 102 of the telecommunications service provider network 120. The TAS is responsible for managing and facilitating device switching in accordance with aspects described herein. In an aspect the unique softphone name or identifier is referred to herein as its globally routable user agent URI, (GRUU), wherein URI stands for uniform resource identifier. Accordingly, when a user's softphone is twinned with a user's primary mobile device, the softphone's GRUU essentially becomes an alias for the primary mobile device identifier.

For ease of explanation a UE 114 that includes a softphone client that has been twinned to a user's primary mobile device 110 via a shared user account and mobile subscriber identity (e.g., MSISDN) with telecommunications service provider is referred to herein as the user's softphone. For example, a user Anne could have a primary mobile device 110 and five softphones (e.g., a softphone on her laptop, a softphone on her tablet, a softphone on her work computer, a softphone on her home office computer and a here Internet television). However, it should be appreciated that reference to a user's 'softphone' does not indicate the softphone is a dedicated device that solely provides softphone functionality. In particular, a user's 'softphone' refers to an instance of a softphone client application that is used in association with a user identity that is shared with a primary mobile device 110 of the user, wherein the shared user identity is represented by a shared identifier (e.g., a shared phone number).

In accordance with various aspect described herein, device switching refers to the movement of a voice or video call in its active state (referred to herein as an active media session) between a user's twinned devices. To provide for seamless device switching between a user's set of twinned devices (wherein the set includes at least a primary mobile device 110 and one softphone client), the respective softphone clients $114_1$-$114_N$ include device switch platforms $116_1$-$116_N$ and the telephone communications service provider network 120 includes an TAS 102 including a device switch application service provider (ASP) platform 104. The device switch platform 116 is configured to generate and send device switch requests to TAS 102 for processing by device switch ASP platform 104. Device switch ASP platform 104 is configured to determine whether a requested device switch is possible and authorized and in response to a determination that the requested device switch is possible and authorized, facilitate the device switch.

A device switch includes the switching of an active media session established between another party phone 118 and one of a user's twinned devices, to be between the other party phone 118 and another one of the user's twinned devices. There are two types of device switching movements available for device switch including a push device switch and a pull device switch. A push involves pushing, by a twinned softphone of the user, an active media session provided on the twinned softphone away to another one of a user's twinned devices. A pull involves pulling, by a twinned softphone of the user, an active media session on another one of the user's twinned devices, to the twinned softphone. A push device switch is initiated by the device switch platform $116_1$ of a softphone client $114_1$ from which an established media session (e.g., voice or video call) on the softphone client $114_1$ is to be transferred away from. A pull device switch is initiated by the device switch platform $116_1$ of a softphone client $114_1$ to which an established media session on another one of the user's twinned devices is to be transferred to.

Device switch requests are sent from the pushing or pulling softphone client 14 to TAS (e.g., they are directed to TAS). Accordingly, the softphone client 114 and device switch platform 116 are responsible for initiation of a device switch, whether it be a push or a pull, without any initial signaling by the softphone client 114 to the other communication devices involved in the device switch. In addition, the information included in a device switch request be known by the device switch platform 116, prior to initiation of the device switch request.

For example, with respect to a push device switch request from softphone client $114_1$, device switch platform $116_1$ is configured to generate and send the push device switch request to device switch ASP platform 104. In an aspect, the push device switch request includes information identifying a twinned device (e.g., primary mobile device 110 or another twinned softphone client $114_N$) to which the softphone client $114_1$ would like to push an existing active call (e.g., voice or video call), established between the softphone client $114_1$ and another party phone 118, and a device switch indicator. In accordance with this example, when the twinned device to which the call is to be pushed is the user's primary mobile device 110, the request can include an identifier for the user's primary mobile device (e.g., the MSISDN of the primary mobile device) to which softphone client $114_1$ would like to push the call (e.g., voice or video) to, and a push device switch indicator. The push request can also include an identifier for the softphone client $114_1$, an identifier for the other party phone, and/or an identifier for the call to be pushed. When the twinned device to which the call is to be pushed to is another twinned softphone client $114_N$, the push request can include an identifier for the softphone client $114_N$ (e.g., a GRUU of the softphone client) to which softphone client $114_1$ would like to push the call (e.g., voice or video) to, and a push device switch indicator.

In another example, with respect to a pull device switch request originating from softphone client $114_1$, device switch platform $116_1$ is configured to generate and send a pull device switch request to device switch ASP platform 104. In an aspect, the pull request can include information identifying a twinned device (e.g., the user's primary mobile device 110 or another twinned softphone client $114_N$) from which the softphone client $114_1$ would like to pull an existing active call (e.g., voice or video), established between the twinned device and a other party phone 118 from, and a pull device switch indicator.

In accordance with this example, when the twinned device from which the softphone client $114_1$ would like to pull the call from is the user's primary mobile device 110, the pull request can include an identifier for the primary mobile device 110, and a pull device switch indicator. The pull request can also include an identifier for the pulling softphone (e.g., the GRUU of softphone client $114_1$). In another aspect, the pull request is provided in the form of a specialized URI for a device switch pull from the user's primary mobile device 110. According to this aspect, the URI can include information identifying the request as a pull request, identifying the device from which the request is to be pulled (e.g., the user's primary mobile device 110), and information identifying the call to be pulled. The device switch request can also include information identifying the pulling softphone client $114_1$. Because the user only has one primary mobile device, a specific identifier (e.g., MSISDN) of the mobile device is not necessary. This is because the ASP can identify the only mobile device twinned to the pulling softphone client $114_1$, using the identifier for the softphone client $114_1$, and information stored in data store accessible to the ASP associating the user's twinned softphones to the user's primary mobile device.

Also in accordance with this example, when the twinned device from which the softphone client $114_1$ would like to pull the call from is another twinned softphone client $114_N$, the pull request can include an identifier for the softphone client $114_N$ from which the call is to be pulled and a device switch pull indicator. The request can also include an identifier for the pulling softphone client $114_1$, (e.g., the GRUU of softphone client $114_1$). In another aspect, the pull request is provided in the form of a specialized URI for device switching away from one of a user's twinned softphones. According to this aspect, the URI can include information identifying the request as a pull request, identifying the device from which the request is to be pulled (e.g., the user's softphone $114_N$), and information identifying the call to be pulled. The device switch request can also include information identifying the pulling softphone client $114_1$. In an aspect, as described infra, in accordance with device switching rules implemented by the telecommunications service provider, a user can only have one active call amongst the user's twinned softphone's at a time. Accordingly, because the user only has one active softphone call established, a specific identifier for the active softphone (e.g., a specific GRUU for softphone client $114_N$) is not necessary in the URI. This is because the ASP can identify the only twinned softphone having the active call using the identifier for the pulling softphone client $114_1$ included in the request, information stored in data store accessible to the ASP associating the user's twinned softphones to one another, and information identifying active call sessions associated with a user's twinned devices.

In an aspect, in addition to pulling active media sessions, system 100 provides for pulling, by a softphone client $114_1$, an on-hold or suspended media session established between a user's primary mobile device 110 and a other party phone 118. According to this aspect, the pull request can include an identifier for the primary mobile device 110, an identifier for the on-hold media session, and a pull device switch indicator. The request can also include an identifier for the pulling softphone (e.g., the GRUU of softphone client $114_1$). In another aspect, the pull request is provided in the form of a specialized URI for pulling an on-hold call away from the user's primary mobile device 110. According to this aspect, the URI can include information identifying the request as a pull request, identifying the device from which the request is to be pulled (e.g., the user's primary mobile device 110), and information identifying the call to be pulled is an on-hold call. The device switch request can also include information identifying the pulling softphone client $114_1$. Because the user only has one primary mobile device, a specific identifier (e.g., MSISDN) of the mobile device is not necessary. This is because the ASP can identify the only mobile device twinned to the pulling softphone client $114_1$, using the identifier for the softphone client $114_1$, and information stored in data store accessible to the ASP associating the user's twinned softphones to the user's primary mobile device.

In an aspect, system 100 facilitates device switching using session initiation protocol (SIP) signaling. According to this aspect, a device switch platform 116 is configured to format device switch requests using SIP messages wherein the device switch indicator and other parts of the device switch request described above (e.g., device/softphone client identifiers, media session identifiers, specialized URI's, etc.) are included in the SIP request message.

FIG. 2 provides a chart 200 outlining SIP messaging for device switch in accordance with aspects and embodiments described herein. Chart 200 identifies five different SIP messages for device switch in rows 201-205, respectively. Each of the device switches originate from a user's softphone A (e.g., softphone client $114_1$) that has been twinned with the user's handset (e.g., primary mobile device 110) or the user's handset and another one of the user's softphones, softphone B (e.g., softphone client $114_N$).

Row 201 characterizes a device switch that is a push of an active media session from softphone A to the user's twinned handset. In an aspect, the SIP request message that is sent from softphone A to TAS 102 is in the form of a SIP refer message that includes at least the MSISDN of the handset and a device switch indicator. In an aspect, softphone A sends the request as an in-session request for an unattended transfer of the established SIP session between softphone A and another party's phone. For example, the SIP refer request to TAS can include the following information per the existing/standard 'SIP Refer' method:

1. From/Contact: Pushing Softphone A (GRUU with MSISDN)
2. To: Transferee (other party on the call, outside of the twinned group)
3. Refer-To: MSISDN of twinned group (Pushing Softphone A to Handset)
4. Referred-by: Pushing Softphone A
5. R-URI: Transferee
6. REFER header will include: 'X-ATT-Client: VoLTE; DS'

In accordance with this example, because the request is an SIP refer and the refer-to field 3. indicates the MSISDN of the twinned group, the TAS can interpret the request as a device switch. In an aspect, this information serves as the device switch indicator. In another aspect, the refer header 6. can serve as the device switch indicator, wherein DS indicates the request is a device switch and X-ATT-Client: VoLTE, indicates the request is for a VoLTE subscriber account of the user.

Row 202 characterizes a device switch that is a push of an active media session from softphone A to the user's twinned softphone B. In an aspect, the SIP request message that is sent from softphone A to TAS 102 is in the form of a SIP refer message that includes at least the GRUU of softphone B and a device switch indicator. In an aspect, softphone A sends the request as an in-session request for an unattended transfer of the established SIP session between softphone A and another party's phone. For example, the SIP refer request to TAS can include the following information per the existing/standard 'SIP Refer' method:

1. From/Contact: Pushing Softphone A (GRUU with MSISDN)
2. To: Transferee (other party on the call, outside of the twinned group)
3. Refer-To: GRUU of Pushed-to Softphone B
4. Referred-by: Pushing Softphone A
5. R-URI: Transferee
6. REFER header will include: 'X-ATT-Client: VoLTE; DS'

In accordance with this example, because the request is an SIP refer and the refer-to field 3. indicates the GRUU of the pushed to softphone B, the TAS can interpret the request as a device switch. In an aspect, this information serves as the device switch indicator. In another aspect, the refer header 6. can serve as the device switch indicator, wherein DS indicates the request is a device switch and X-ATT-Client: VoLTE, indicates the request is for a VoLTE subscriber account of the user.

Row 203 characterizes a device switch that is a pull, by softphone A of an active media session from the user's twinned softphone B to softphone A, wherein the active media session is established between softphone B and another party's phone. In an aspect, the SIP request message that is sent from softphone A to TAS 102 is in the form of a SIP invite message that includes at least the request URI for device switching from a softphone and a device switch indicator. In an aspect the request URI serves as the device switch indicator. For example, the SIP invite request to TAS can include the following information per the existing/ standard 'SIP Invite' method:

1. From/Contact: Pulling Softphone A (GRUU with MSISDN)
2. To: "sip:pull-SP-active@ one.att.net"
3. INVITE header may include: 'X-ATT-Client: VoLTE; DS'

In accordance with this example, because the request is an SIP invite with an identifier (e.g., GRUU with MSISDN) of softphone A and the 'to field' 2. indicates a specialized URI identifying the request as a pull of an active twinned softphone (SP) media session, the TAS can interpret the request as a device switch. In an aspect, this information (e.g., fields 1. and 2.) serves as the device switch indicator. In another aspect, the invite header 3. can serve as the device switch indicator, wherein DS indicates the request is a device switch and X-ATT-Client: VoLTE, indicates the request is for a VoLTE subscriber account of the user.

Row 204 characterizes a device switch that is a pull, by softphone A of an active media session from the user's twinned handset to softphone A, wherein the active media session is established between the user's twinned handset and another party's phone. In an aspect, the SIP request message that is sent from softphone A to TAS 102 is in the form of a SIP invite message that includes at least the request URI for device switching from a handset and a device switch indicator. In an aspect the request URI serves as the device switch indicator. For example, the SIP refer request to TAS can include the following information per the existing/ standard 'SIP Invite' method:

1. From/Contact: Pulling Softphone A (GRUU with MSISDN)
2. To: "sip:pull-VoLTE-active@one.att.net"
3. INVITE header may include: 'X-ATT-Client: VoLTE; DS'

In accordance with this example, because the request is an SIP invite with an identifier (e.g., GRUU with MSISDN) of softphone A and the to field 2. indicates a specialized URI identifying the request as a pull of an active twinned handset (e.g., specifically a VoLTE handset) media session, the TAS can interpret the request as a device switch. In an aspect, this information (e.g., fields 1. and 2.) serves as the device switch indicator. In another aspect, the invite header 3. can serve as the device switch indicator, wherein DS indicates the request is a device switch and X-ATT-Client: VoLTE, indicates the request is for a VoLTE subscriber account of the user.

Row 205 characterizes a device switch that is a pull, by softphone A of an on-hold or suspended media session from the user's twinned handset to softphone A, wherein the on-hold media session is established between the user's twinned handset and another party's phone. In an aspect, the SIP request message that is sent from softphone A to TAS 102 is in the form of a SIP invite message that includes at least the request URI for device switching from a handset and a device switch indicator. In an aspect the request URI serves as the device switch indicator. For example, the SIP refer request to TAS can include the following information per the existing/standard 'SIP Invite' method:

1. From/Contact: Pulling Softphone A (GRUU with MSISDN)
2. To: "sip:pull-VoLTE-hold@one.att.net"
3. INVITE header may include: 'X-ATT-Client: VoLTE; DS'

In accordance with this example, because the request is an SIP invite with an identifier (e.g., GRUU with MSISDN) of softphone A and the to field 2. indicates a specialized URI identifying the request as a pull of an on-hold twinned handset (e.g., specifically a VoLTE handset) media session, the TAS can interpret the request as a device switch. In an aspect, this information (e.g., fields 1. and 2.) serves as the device switch indicator. In another aspect, the invite header 3. can serve as the device switch indicator, wherein DS indicates the request is a device switch and X-ATT-Client: VoLTE, indicates the request is for a VoLTE subscriber account of the user.

Referring back to FIG. 1, as noted above, device switch requests sent by a softphone client 114 or device switch platform 116 of the softphone client are directed to and received by TAS 102. In an aspect, TAS is a back-to-back SIP user agent that maintains the call state of calls serviced by telecommunications service provider network 120. For example, TAS 102 can contain the service logic which provides the basic call processing services including digit analysis, routing, call setup, call waiting, call forwarding, conferencing, etc. In addition, TAS 102 can include device switch ASP platform 104 to process received device switch requests. In particular, TAS 102 is configured to identify a received device switch request as a device switch push or pull request, determine whether the device switch request is possible and authorized, and in response to a determination that the device switch request is possible and authorized, facilitate the device switch. Device switch platform 104 is configured to determine whether the device switch is possible and authorized based on various rules defining device switching for twinned devices provided by the telecommunications service provider and information regarding the user's account associated with the device switch request. For example, the device switch ASP platform 104 can reject a device switch request for pulling from a user's softphone B to a user's softphone A when softphone B has not been twinned with the same primary mobile device as softphone A. In another example, a device switching rule could restrict pulling of an on-hold call from a user's primary mobile device to a user's softphone A to instances where none of the user's other twinned devices, except possibly softphone A, has another active call. In the example where softphone A has another active call, the device switched call would be offered to softphone A, where it can place the active call on hold and receive the switched call. Various aspects regarding control and facilitation of device switching by TAS are discussed in greater detail with respect to FIGS. 4 and 5.

In an aspect, telecommunications service provider network 120 employs an IMS architecture to facilitate device switching between a user's twinned devices. According to this aspect, TAS 102 is configured/authorized to provide device switching only for calls from devices registered with the IMS. In particular, calls that are not IMS controlled are not received/processed by TAS. Because TAS is responsible for device switching, these calls are not eligible for device switch. In addition, the telecommunications service provider network 120 can support device switching of calls only to devices capable of supporting the type of bearer being moved (e.g., voice or voice and video). In another aspect, telecommunications service provider 120 employs a VoLTE network to facilitate device switching in association with the IMS. According to this aspect, TAS is configured/authorized to provide device switching only for calls anchored within the VoLTE/IMS core of the telecommunications service provider network 120.

According to this aspect, an IMS controlled call that is received by a user's VoLTE primary mobile device when the VoLTE device is not within VoLTE network coverage is eligible for switch. For example, in this scenario, TAS can provide for device switching when a user's twinned softphone pulls the call from the handset to the twinned softphone. However, when the VoLTE primary mobile device places a call while outside VoLTE coverage, this call will not be IMS controlled and thus is not eligible for device switch. In addition, a VoLTE customer within VoLTE coverage can make or receive a call that is IMS controlled, but then drop to CSFB (e.g., if traveling outside of the VoLTE coverage), yet the call will remain under IMS control and be eligible for switch. Further, softphone initiated or terminated calls (inbound or outbound) are IMS controlled by nature and eligible for switch and remain eligible for switch even if pushed to the user's VoLTE handset when the handset is outside of VoLTE coverage.

Figure 3:
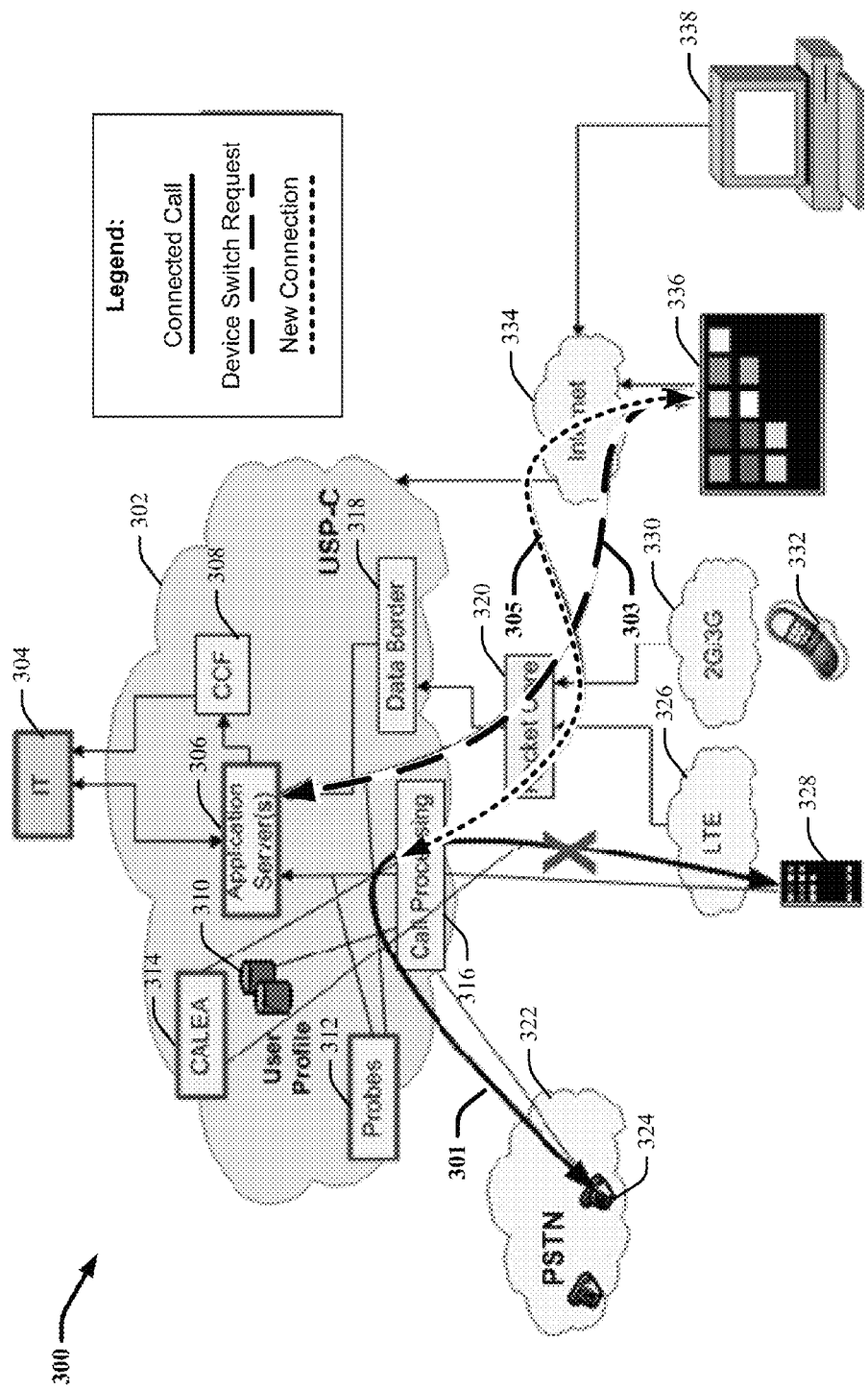
FIG. 3 presents an example telecommunication service provider network system architecture and call flow that provides for seamless movement of media sessions between twinned communication devices in accordance with aspects and embodiments described herein.

FIG. 3 presents an example telecommunication service provider network system 300 architecture and call flow that provides for seamless movement of media sessions between twinned communication devices in accordance with aspects and embodiments described herein. System 300 can include the various features and functionalities described with respect to system 100. Repetitive description of like elements employed in respective embodiments of systems and devices described herein is omitted for sake of brevity.

The depicted telecommunications service provider network 300 supports device switching in accordance with various aspects and embodiments described herein. The telecommunications service provider network 300 includes a universal voice service platform core (USP-C) 302 that employs an IMS architecture to facilitate device switching between a user's twinned devices. In an aspect, device switching as described herein is only provided for media sessions (e.g., voice and video) that are IMS controlled through the USP-C 302. The USP-C include various elements associated with processing calls and device switching over IMS. The application servers 306 are configured to host and execute various services provided by the telecommunications service provider network 300. In accordance with the discloses subject matter, the application servers 306 include the TAS (e.g., TAS 102) which controls device switching as described herein. The application servers 306 interface with Charging Collection Function (CCF) 316 and Call Session Control Functions (CSCF) or Call Processing 316 services. The CSCF 316 includes servers or proxies that are used to process SIP signaling packets in the USP-C IMS based network. Information technology (IT) 304 accessible to the application servers 306 and the CCF 308 facilitates interaction there between.

The user profile databases 310 (often referred to as the Home Subscriber Server (HSS)) provides a master user database that supports the IMS network entities that actually handle calls. They contain the subscription-related information (subscriber profiles), perform authentication and authorization of the user, and can provide information about the subscriber's location and IP information. In accordance with the disclosed device switching, the user profile databases 310 can include information identifying user's subscribed to receive VoLTE services and information identifying and associating twinned devices of the user. In an aspect, device switching away from a user's primary mobile device (e.g., the device assigned to the MSISDN) afforded by telecommunications service provider system 300 is only available for media session established on the user's primary mobile device (e.g., smartphone 328) using VoLTE. For example, non-VoLTE voice calls (e.g., calls initiated on the on 2G, 3G, PSTN, etc. networks) established on the user's primary mobile device are not supported for the "pull" scenario to the user's twinned softphone device. However, system 300 supports device switching for 2G/3G terminated handset calls. Further, system 300 supports movement of softphone (e.g., a twinned softphone provided on tablet PC 336 or desktop PC 338) originated or terminated calls to the user's primary mobile device without regard to the RAN environment (2G/3G/LTE are all supported).

Probes 312 monitor SIP signaling on the USP-C network 302 and particularly monitor the SIP messages (refer and invite messages) that will be used to request and facilitate a device switch as it monitors all SIP messages. CALEA 314 (Communications Assistance for Law Enforcement Act) corresponds to a probe specifically configured to monitor compliance of call processing in association with the Communications Assistance for Law Enforcement Act. The call processing box 316 denotes the various call processing aspects associated with servicing calls on the USP-C network 302. The data border box 318 corresponds to services and proxies for processing calls as they pass through the border between external networks (e.g., access networks) and into the USP-C and packet core processing onto the USP-C Packet core 320 corresponds to one of more packet data networks. For example, packet core 320 can include an evolved packet core (EPC) which is the framework for providing converged voice and data on an (LTE) network 326. 2G and 3G network architectures 320 process and switch voice and data through two separate sub-domains: circuit-switched (CS) for voice and packet-switched (PS) for data. The Packet core 320 unifies voice and data on an IP service architecture and voice is treated as just another IP application. This allows operators to deploy and operate one packet network for 2G, 3G, WLAN, WiMAX, LTE and fixed access (Ethernet, DSL, cable and fiber). Various devices can connect to the USP-C network 302 through different access networks. For example, a traditional landline telephone 324 can connect via a PSTN 322. A VoLTE enabled smartphone 238 can connect via an LTE network 326. A non-VoLTE enabled mobile device 332 can connect via a 2G or 3G network 330, and various web browser enabled devices, such as a tablet PC 336 or a desktop PC 338 can connect via the Internet 334.

In addition to depiction of an example telecommunications service provider network system 300 employed by a telecommunications service provider entity that enables device switching between a user's twinned devices, FIG. 3 also provides an example call flow scenario for call switching via system 300. In accordance with the depicted call flow, a VoLTE subscriber/user has registered and twinned a softphone client application provided on the user's tablet PC 326 with the user's primary mobile device 328. The subscriber has an established user account with the telecommunications service provider that includes registration for VoLTE and softphone service afforded by the telecommunications service provider. The user profile database 310 includes information associated with the user's account, including information associating the user's primary mobile device and the user's twinned softphone client with a same mobile subscriber number (e.g., MSISDN of the primary mobile device 328).

The exemplary call flow is represented by call signal lines 301, 303 and 305. The exemplary call flow demonstrates a scenario wherein a call established between the user's primary mobile device 328 and another user's landline device 324 is disconnected and re-established between the other user's landline device 324 and the user's twinned softphone client provided on her table PC 336. The solid call signal line 301 shows the user's primary mobile device 328 on an LTE (e.g., specifically VoLTE) connected call to the other user's PSTN connected device 324. Using her softphone provided on her tablet PC 336 the user can request to switch the call from her primary mobile device 328 to her softphone. In association with the user's request, the softphone sends a device switch request, represented by the large dashed signal line 303, to the application server(s) 306 (e.g., specifically TAS) requesting the pull call device.

In response to identifying the existing call corresponding to call signal line 301, determining that the participating devices (e.g., devices 328 and the softphone client of device 336) are registered with the IMS network of the USP-C network 302, and determining that the user's primary mobile device 328 and the user's softphone client of device 336 are twinned, the application server 306 will move the call from the user's primary mobile device 328 to the user's softphone client of the tablet PC 336. The application server 336 facilitates moving the call by re-inviting the other endpoint landline device 324, into a new conversation with the softphone of the user's tablet PC 336 via the IMS CSCF 316. When the call is moved, the leg of the call from the user' primary mobile device 328 to the landline device 324 is dropped (e.g., as signified via the X mark), and a new connection, represented by the small dashed signal line 305, is established between the landline device 324 and the user's softphone client on her tablet PC 336.

Figure 4:
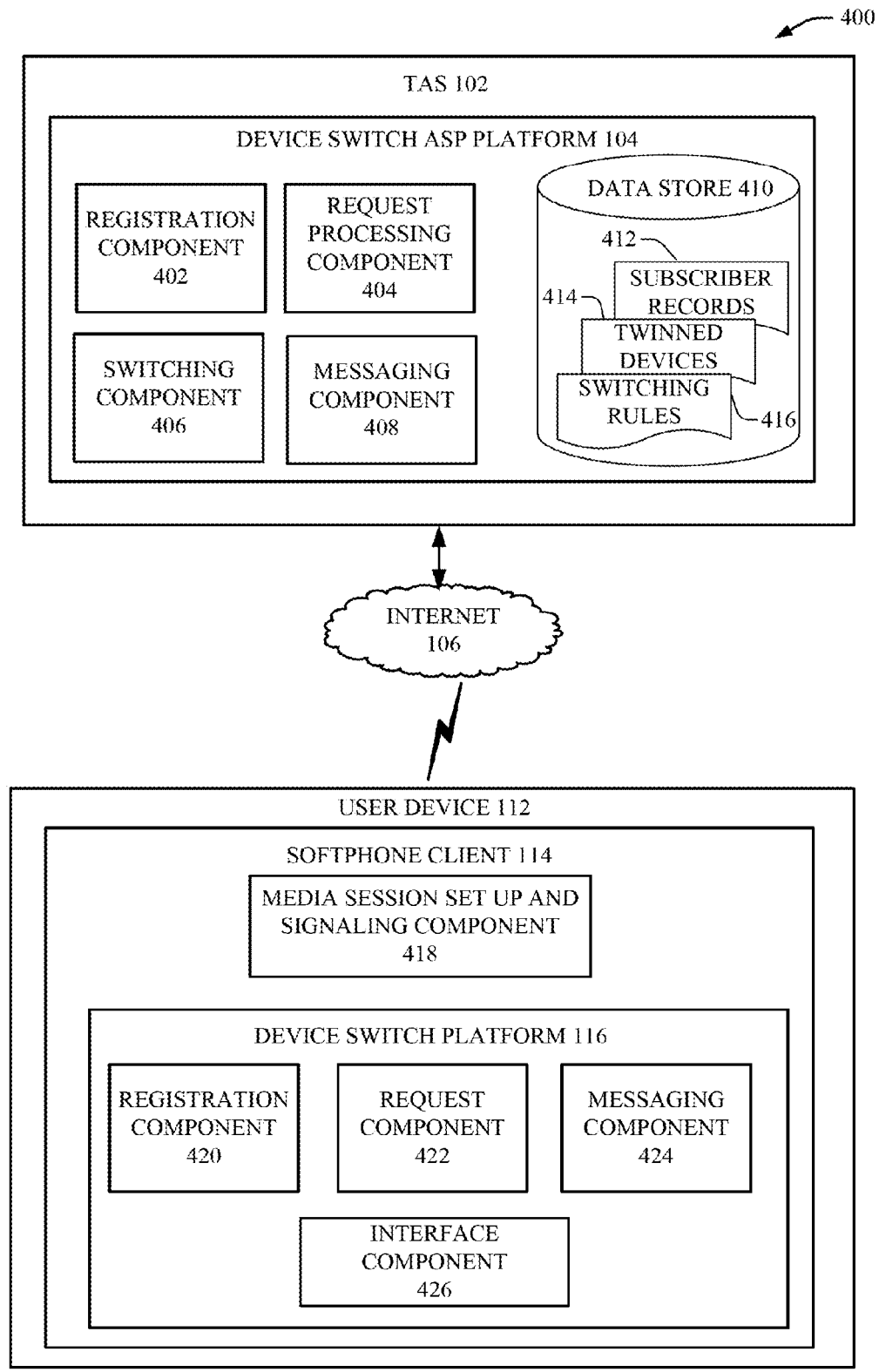
FIG. 4 illustrates another example system that provides for seamless movement of media sessions between twinned communication devices in accordance with aspects and embodiments described herein.

FIG. 4 presents another example system 400 that provides for seamless movement of media sessions between twinned communication devices in accordance with aspects and embodiments described herein. System 400 provides a more detailed view of TAS 102 and a UE 112 including a softphone client 114 as presented in system 100. Although system 400 depicts a portion of system 100, it should be appreciated that such depiction is merely for exemplary purposes and system 400 can include the various features and functionalities described with respect to system 100 and the like. Repetitive description of like elements employed in respective embodiments of system and devices described herein is omitted for sake of brevity.

As described supra, TAS 102 can include device switch ASP platform 104 to facilitate device switching in accordance with aspect and embodiments described herein. Device switch ASP platform 104 can include registration component 402, request processing component 404, switching component 406, messaging component 408 and data store 410. Data store 410 can include a variety of information needed for device switch ASP platform to control and facilitate device switching. For example, data store 410 can include subscriber records 412 that includes information regarding a subscriber's account with the telecommunications service provider, including services registered for by the user (e.g., VoLTE services and softphone service), information identifying the user' registered primary mobile device (e.g., the MSISDN for the user and the user's handset), as well as policies governing provision of the services subscribed to by the user. Data store 410 can also include information identifying a subscriber's twinned devices 414. For example, this information can include identifiers for each of a user's twinned softphones (e.g., GRUU's of the respective softphones). In addition, identifiers for the user's twinned softphones can be associated with the user's primary mobile device identifier (e.g., the user's MSISDN). In another example, this information can include URI's for respective twinned devices, including the user's primary mobile device and the user's one or more twinned softphone device. Data store 410 can also include information defining device switching rules and provisions regarding control and authorization of device switching by device switch ASP platform 104.

It is noted that the data store 410 can include volatile memory(s) or nonvolatile memory(s), or can include both volatile and nonvolatile memory(s). Examples of suitable types of volatile and non-volatile memory are described below with reference to FIG. 19. The memory (e.g., data stores, databases) of the subject systems and methods is intended to comprise, without being limited to, these and any other suitable types of memory. Although depicted as residing completely within TAS/device switch ASP platform 104, it is noted that the data store 410 can reside partially within TAS/device switch ASP platform 104 and/or be locally (or remotely) coupled to the TAS/device switch ASP platform 104. For example, data store 410 and/or a portion of the information included in data store 410 can be located external to device switch ASP platform 104 and accessible to device switch ASP platform 104. For instance data store 410 and/or a portion of the information included in data store 410 can be located in user profile databases or an HSS (e.g., such as user profile databases 310) accessible to the device switch ASP.

Registration component 402 is configured to facilitate twinning of a user's softphone client(s) with the user's primary mobile device. In an aspect, the registration component 402 and its associated device twinning procedure can be provided at a server/system remote from device switching platform 104 yet internal to the telecommunications service provider network/system.

Request processing component 404 is configured to receive and process device switch requests sent from a softphone client 114 based on information provided in data store 410. In an aspect, in response to reception of a device switch request to move a call, request processing component 404 determines whether the request is a request to move the call to a device that has been twinned with the requesting device. In particular, request processing component 404 is configured to deny a device switch request when the call to which the device will be moved is not twinned with the requesting device and vice versa. Accordingly, when a device switch request is received that is a request to push a call from a first device to a second device or to pull a call from the second device to the first device, request processing component 404 is configured to determine whether the first device and the second device are twinned, that is whether the first device and the second device are associated with a common mobile subscriber identity registered for an account associated with the telecommunications service provider.

In an aspect, request processing component 404 employs information provided in the device switch request and twinned devices information 414 to determine whether the first device and the second device are twinned. In particular, as described supra, the device switch request will include information identifying (e.g., an MSISDN, a GRUU, a URI, etc.) or that can be used to identify the first device and the second device. Using this information, the request processing component 404 can look up the respective devices in the twinned device 414 information to determine whether the first device and the second device are twinned. In an aspect, in response to a determination that the first and second device are twinned, the switching component 406 can proceed with device switching based on the request.

Request processing component 404 is also configured to analyze a received device switch requests to determine whether the request is a push or a pull and to determine the media session involved in the push or pull. For example, in response to receipt of a request from a user's softphone A to pull an active call from her twinned handset, request processing component 404 can employ information in the request (e.g., an identifier for softphone A, an identifier for the twinned mobile device, and/or the URI) to determine what mobile device the softphone A is twinned to and then identify whether the twinned mobile device has an active call. In response to a determination that the respective devices are twinned and identification of the active call on the handset, the switching component 406 can proceed with device switching based on the request. In another example, in response to receipt of a request from a user's softphone A to pull an active call from her twinned softphone B, request processing component 404 can employ information in the request (e.g., an identifier for softphone A, an identifier for softphone B, and/or the URI) to identify softphone B as being twinned to softphone A, and then identify whether the twinned softphone B has active call. In response to a determination that the respective devices are twinned and identification of the active call on softphone B, the switching component 406 can proceed with device switching based on the request.

Request processing component 404 is further configured to deny/reject device switch requests for various reasons even though the devices between which the call is requested to be moved are twinned. Information describing these scenarios (e.g., information defining authorized and unauthorized device switches) can be included in device switching rules 416. In an aspect, messaging component 408 is configured to generate and send a device switch request rejection/error message to the requesting softphone client (e.g., via messaging component 424) in these scenarios.

In an aspect, request processing component 404 is configured to reject an SIP invite to pull a handset call to a user's twinned softphone when another one of the user's softphone within the twinned group already has an active call. According to this aspect, the request processing component 404 is configured to access and/or receive information identifying whether another one of the user's softphone within the twinned group already has an active call. In an aspect, request processing component 404 is configured to reject an SIP invite to pull a call to a user's twinned softphone from one of the user's twinned devices when the twinned device does not have an active call to pull. According to this aspect, the request processing component 404 is configured to access and/or receive information identifying whether the other one of the user's softphone has an active call (as described above). In another aspect, request processing component 404 is configured to reject an SIP refer to push an active call to a user's twinned softphone within the twinned group when the referring/pushing softphone also has a call on hold. According to this aspect, the request processing component 404 is configured to access and/or is configured to access and receive information identifying whether the referring/pushing softphone also has a call on hold.

With this aspect, request processing component 404 is configured to deny an SIP refer to push an on-hold or suspended call. For example, if the pushing softphone has both an active call and a call on-hold, the softphone/user could push the active call, or would need to bring the on-hold call to be active in order to push it to the handset device. In another aspect, request processing component 404 is configured to deny an SIP refer to push an active call from a twinned softphone to the twinned mobile device when the mobile device already has an active call and an additional on hold call. In yet another aspect, request processing component 404 is configured to deny a request to pull or push a call between a user's twinned devices based on the type of the call or the other party involved in the call. For example, request processing component 404 can be configured to deny device switching for emergency (e.g., 911) calls.

Switching component 406 is configured to facilitate device switches based on a device switch request in response to processing (e.g., authorization) by request processing component 404. In an aspect, switching component 406 is configured to employ SIP signaling to facilitate reestablishing an active or on-hold media session between the device to which the call is requested to be switched to and the other party's device. For example, switching component 406 can generate and send an SIP re-invite to the other party involved in the media session. The SIP re-invite will invite the other party to reestablish the existing media session with the 'switched to' device. Switching component 406 can also facilitate relaying of SIP signaling messages between the devices involved in the switched media session (e.g., the pushing/pulling softphone, the device to which or from which the call is to be pushed/pull, and the other party device involved in the call). In addition, switching component 406 can direct the device from which a call is moved to end or tear down the original call in response to reestablishment of the call between the other party and the device to which the call is moved. Various examples of SIP signaling schemes provided by switching component 406 are provided in FIGS. 7A-7B and FIGS. 9A-9C.

Softphone client 114 can include device switch platform 116 to facilitate device switching by the softphone client 114 in accordance with aspects and embodiments described herein. Softphone client 114 can also include media session set up and signaling component 418 to facilitate establishing VoIP media sessions in accordance with existing softphone client practices (e.g., using SIP). In an aspect, device switch platform 116 is included within softphone client 114. In another aspect, device switch platform 116 can be configured as a separate application configured to interface with a legacy softphone client.

Device switch platform 116 can include registration component 420, request component 422, messaging component 424 and interface component 426. Registration component 420 is configured to facilitate registering softphone client 114 for softphone services provided by the telecommunications service provider that provides cellular services for mobile users. In addition, registration component 420 can also facilitate twinning softphone client 114 with a user's primary mobile device in association with the user's account with the telecommunications service provider.

Request component 422 is configured to generate and send device switch requests as described herein. In particular, request component 422 can generate and send the SIP refer push requests and the SIP invite pull requests described with respect to FIG. 2 in response to selection, by the user of the softphone client 114 to push or pull an active or on-hold media session. In an aspect, request component 422 is configured to allow the user to select an authorized push or pull request. For example, request component 422 can prohibit the user from selecting the device switch requests described above that request processing component 404 is configured to deny/reject. In an aspect, the user interface, (e.g., generated by interface component 426) to facilitate device switching on the softphone client 114 can prevent selection of unauthorized device switches by excluding such options from a device switch menu. For example, if no devices are twinned to a user's primary mobile device, interface component 426 can display a message indicating "no devices available for Device Switching."

Interface component 426 is configured to generate a user interface that facilitates device switching on the softphone client. For example, interface component 426 can generate a user interface that identifies a user's twinned devices and provides a menu with options to push a media sessions from the softphone client 114 to another (selectable) one of the user's twinned devices. The interface can also provide a menu with options to pull media sessions to the softphone client 114 from another (selectable) one of the user's twinned devices.

In an aspect, if the softphone client 114 (call it SP-1) has one active session (not on hold), interface component 114 is configured to generate and display a push menu. For example, the push menu can include one or more of the following options:

1. "Push Active Call to Mobile Handset," wherein interface component 426 is configured to display this option only if both devices are twinned/registered. (Note: the request will be denied via TAS if the Mobile Handset already has 2 sessions); and 2. "Push Active Call to [SP-2 Label/Name]," wherein interface component 426 is configured to display this option only if SP-2 is registered/twinned and if SP-1 does not have a call on hold; and 3. "Pull Active Call from Mobile Handset," wherein interface component 426 is configured to display this option only if both devices are twinned/registered. (Note: the request will be denied via TAS if the Handset does not have an Active call via TAS);

4. "Pull On-Hold Call from Mobile Handset," wherein interface component 426 is configured to display this option only if both devices are twinned/registered. (Note: the request will be denied via TAS if the Handset does not have an On-Hold call via TAS).

In another aspect, if the softphone client 114 (call it SP-1) has no active sessions or one session on hold, interface component 114 is configured to generate and display a pull menu. For example, the pull menu can include one or more of the following options:

1. "Pull Active Call from Mobile Handset," wherein interface component 426 is configured to display this option only if both devices are twinned/registered. In an aspect, interface component 426 is configured to remove this option from the display menu if SP-1 has a call on hold. (Note: the request will be denied via TAS if the Handset does not have an Active call via TAS);

2. "Pull On-Hold Call from Mobile Handset," wherein interface component 426 is configured to display this option only if both devices are twinned/registered. (Note: the request will be denied via TAS if the Handset does not have an On-Hold call via TAS); and 3. "Pull Active Call from Other Softphone," wherein interface component 426 is configured to display this option only if at least 1 other Softphone is registered/twinned. In an aspect, interface component 426 is configured to remove this option from the display menu if SP-1 has a call on hold. In an aspect no SP Label/Name appears when the telecommunications service provider only permits 1 softphone of a set of twinned softphones to be active at time. (Note: the request will be denied via TAS if the other Softphone has two sessions (one active and one on hold) or if no other Softphones have an active call).

Messaging component 424 is configured to receive and present rejection/error messages from messaging component 408 in response to denial of a device switch request by request processing component 404 or request component 422.

Figure 5:
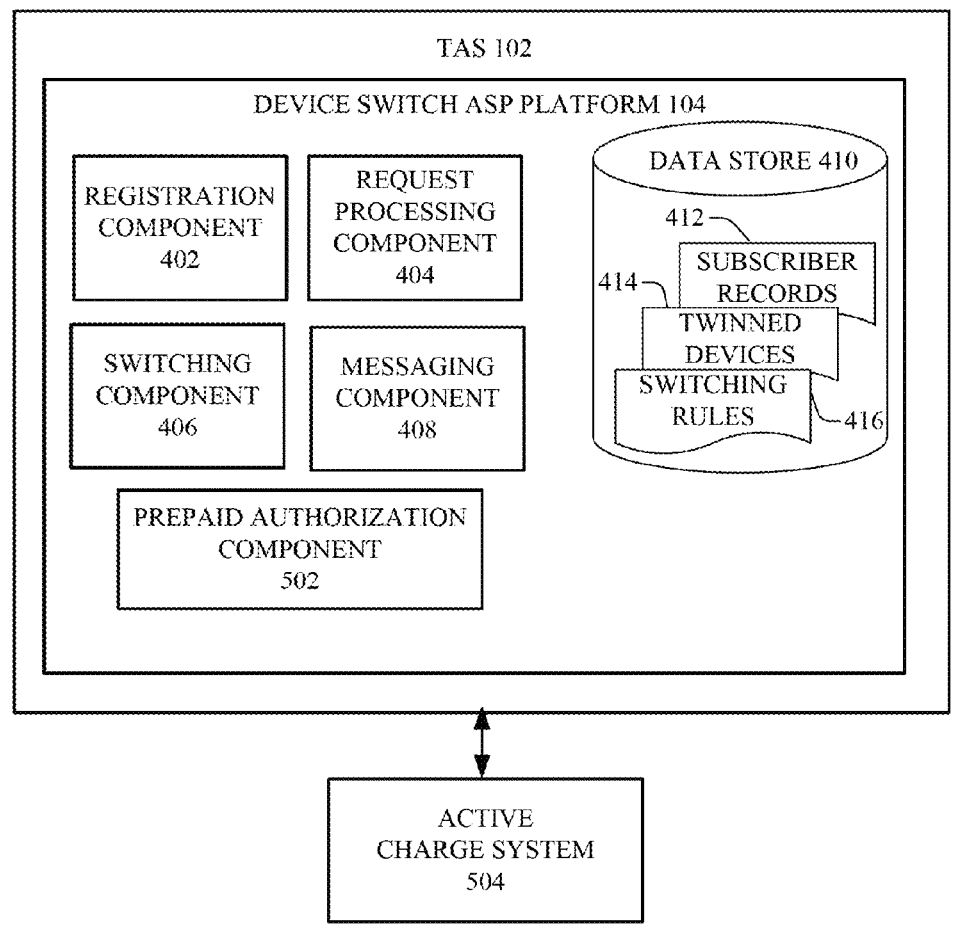
FIG. 5 illustrates another example telecommunications application server that facilitates seamless movement of media sessions between twinned communication devices in accordance with aspects and embodiments described herein.

FIG. 5 presents another embodiment of TAS 102 in accordance with aspects described herein. Repetitive description of like elements employed in respective embodiments of system and devices described herein is omitted for sake of brevity.

In an aspect, device switch ASP platform 104 can include a prepaid authorization component 502 to facilitate device switching for a subscriber having prepaid cellular and/or softphone services with the telecommunications service provider in association with his or her user account. With a prepaid service, the subscriber pre-pays for an amount of minutes of a particular wireless communication service. For example, with respect to VoLTE voice and video services, the user can pre-pay for a desired amount of VoLTE voice and video minutes/data usage. In another example, with respect to softphone services, the user can pre-pay for a desired amount of softphone communication voice and/or video minutes/data usage.

When a user with a pre-paid account requests a device switch, prepaid authorization component 502 is configured to communicate with an external prepaid active charge system 504 to determine whether the device switch is authorized. In particular, the active charge system 504 is configured to keep track of service usage for a user's prepaid account in real-time or substantially real-time. According, active charge system 504 can provide information regarding how many minutes and/or how much data a user has left on her account whether it be her prepaid softphone services minutes/data or her cellular minutes/data.

In response to a device switch request to move a call to a prepaid user's handset, prepaid authorization component 502 is configured to communicate with the active charge system 504 to determine whether the user has sufficient cellular prepaid minutes/data to support the call on the handset. In response to a determination that the user has sufficient minutes/data, prepaid authorization component 502 can authorize signaling component to proceed with the requested device switch. Similarly, in response to a device switch request to move a call to a prepaid user's softphone, prepaid authorization component 502 is configured to communicate with the active charge system 504 to determine whether the user has sufficient softphone service prepaid minutes/data to support the call on the softphone. In response to a determination that the user has sufficient minutes/data, prepaid authorization component 502 can authorize signaling component to proceed with the requested device switch. In addition, prepaid authorization component 502 is configured to monitor or re-check minute/data usage during an active call. When the bucket of minutes/data is depleted, any active calls on devices that consume minutes from the prepaid bucket are dropped, and from then on no new calls may be completed.

Figure 6:
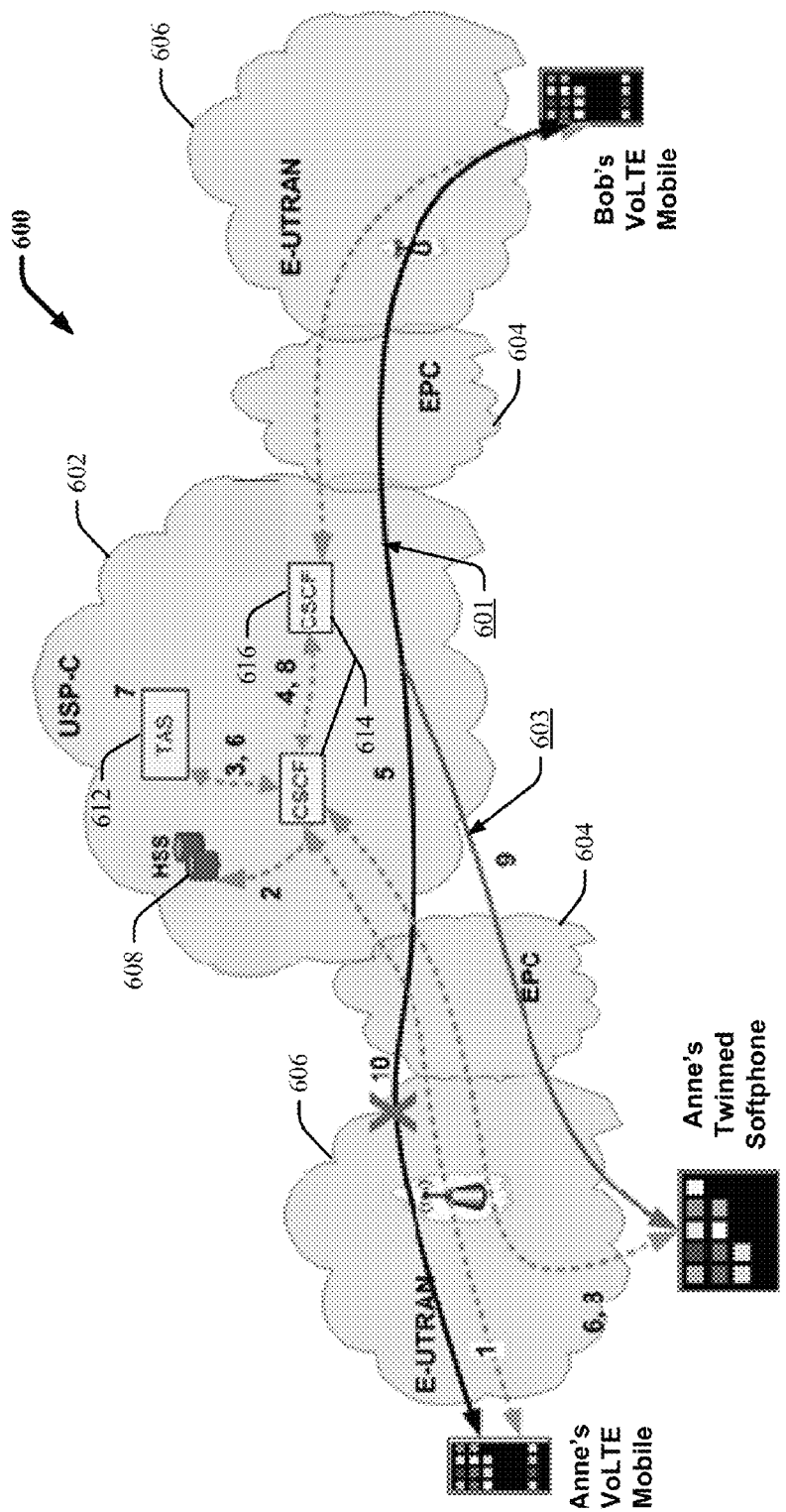
FIG. 6 presents an example call flow diagram for device switching over a telecommunications service provider network in accordance with aspects described herein.

FIG. 6 presents an example call flow diagram for device switching over a telecommunications service provider network 600 in accordance with aspects described herein. Repetitive description of like elements employed in respective embodiments of systems, devices and methods described herein is omitted for sake of brevity.

The example call flow is performed over a telecommunications service provider network 600 that supports device switching in accordance with various aspects and embodiments described herein. For example, network 600 can include same or similar elements as networks 120, 300, and the like. The example telecommunications service provider network 600 includes a USP-C 602 that employs an IMS architecture to facilitate device switching between a user's twinned devices. The USP-C includes an HSS 608, a TAS 612 and a CSCF 614. The depicted telecommunications service provider network 600 further includes VoLTE network elements to facilitate VoLTE media sessions and signaling, including Evolved UMTS Terrestrial Radio Access Network(s) (E-UTRAN) 606, and EPC(s) 604.

The example call flow depicted in FIG. 6 includes a primary user, referred to herein as Anne and secondary user, referred to herein as Bob. Anne has a primary VoLTE mobile device and a softphone device that have been registered for VoLTE and softphone services, respectively, from the telecommunications service provider, and twinned in accordance with aspects described herein. The depicted call flow demonstrates a device switch pull of an active call from Anne's VoLTE mobile device to Anne's twinned softphone, wherein the active call is originally established as a VoLTE call (e.g., voice or voice and video) between Anne's VoLTE mobile device and Bob's VoLTE mobile device. The dashed lines represent signaling (e.g., SIP signaling).

The call flow begins at 1 with Anne making a voice or voice and video call from her VoLTE mobile device using VoLTE to Bob. At 2, the call enters the CSCF 616 which quires the HSS 608 for services subscribed to by Anne. At 3, TAS is invited to process call based on Anne's subscribed to services (including VoLTE voice and/or VoLTE video). At 4, TAS sends an invite to the called party, Bob's VoLTE mobile device (requesting voice and video resources) which answers. At 5, the call is connected and voice and video paths are established between Anne's VoLTE mobile device and Bob's VoLTE mobile device, represented by call signal line 601.

At 6, Anne picks up her twinned softphone device (e.g., her tablet PC) and opens a device switch application associated with or included with the softphone client application. Using the device switch application, Anne selects an option to pull the call from her VoLTE mobile device. In response to the selection, the device switch application generates and sends an SIP invite with a device switch request URI to TAS. The device switch request is sent to TAS via the IMS CSCF and it is routed to the TAS by the initial filter criteria (IFC) in Anne's service profile (e.g., associated with her user account) provided in the HSS. At 7, TAS searches for an existing active call established on Anne's VoLTE mobile device (when the existing call is not identified in the SIP device switch request message). In another aspect, the existing active call on Anne's VoLTE mobile device can be identified in the SIP device switch request message. At 8, TAS generates and sends an SIP re-invite to Bob's VoLTE mobile inviting Bob's VoLTE mobile device to re-establish the active call with Anne's twinned softphone device. At 9, in response to acceptance by Bob's VoLTE device, voice and video bearer paths are established between Bob's VoLTE device and Anne's twinned softphone device. The new connection is represented by line 603. Then at 10, Anne's VoLTE mobile device drops the original call (denoted by the X mark).

Figure 7A:
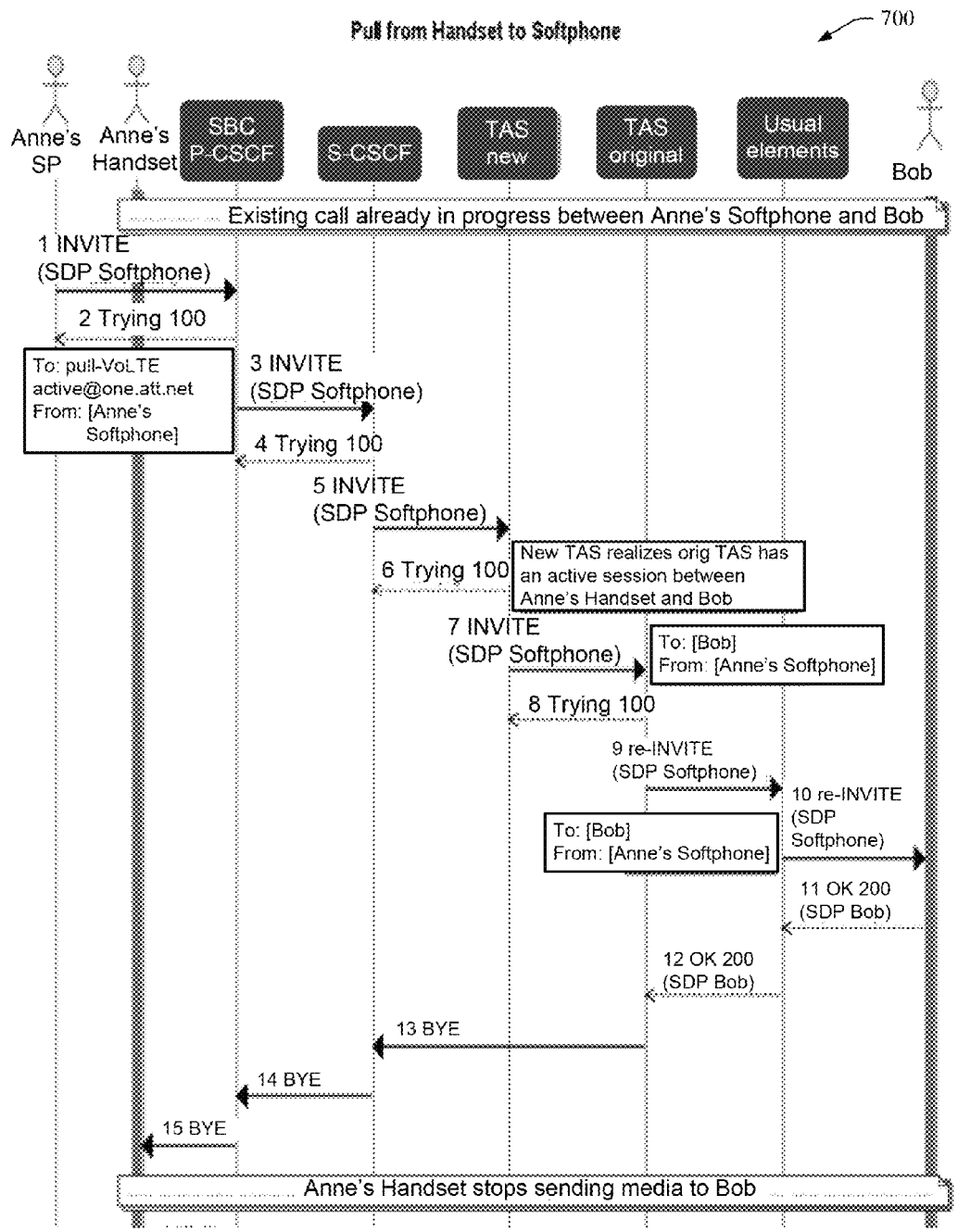
FIGS. 7A-7B present an example session initiation protocol (SIP) ladder diagram for the call flow in accordance with aspects described herein.
Figure 7B:
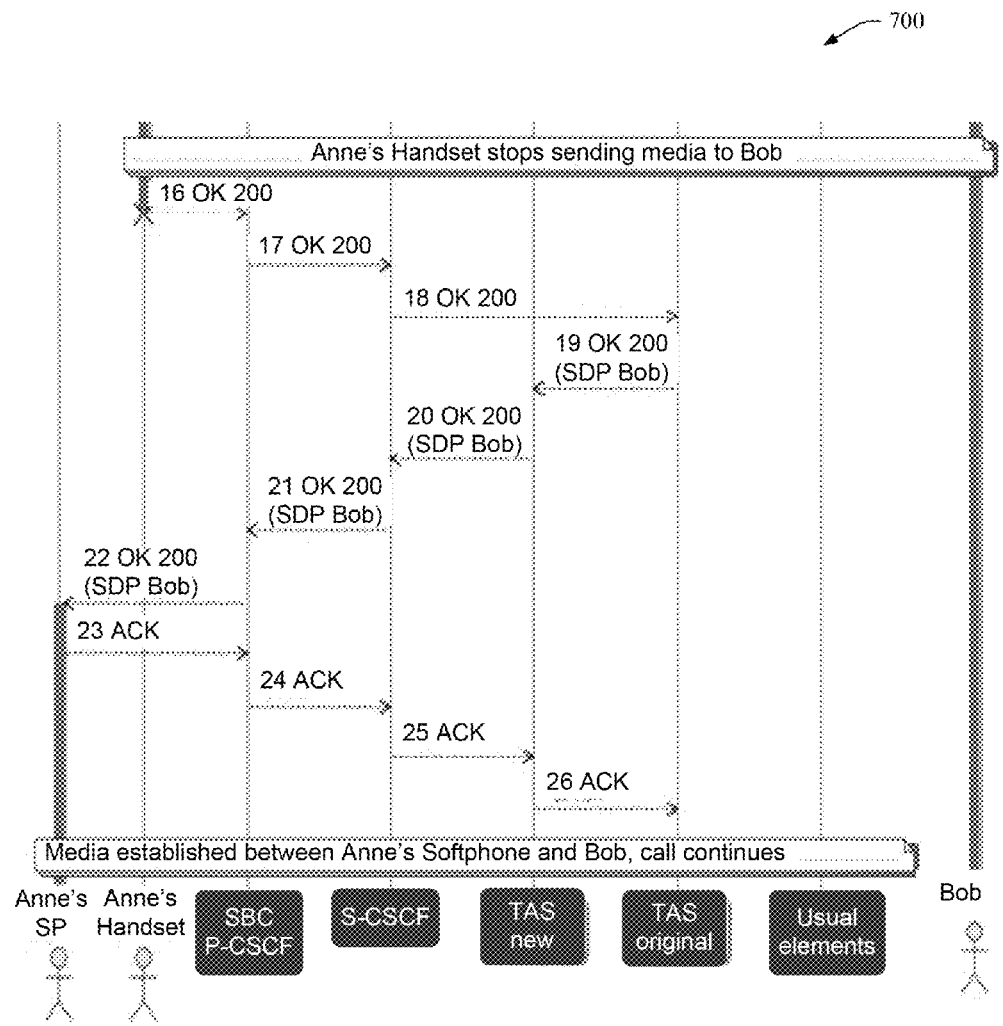

FIGS. 7A-7B present an example SIP ladder diagram 700 for the call flow described in call flow diagram 600 in accordance with aspects described herein. Repetitive description of like elements employed in respective embodiments of systems, devices and methods described herein is omitted for sake of brevity.

SIP ladder diagram 700 provides SIP signaling for the device switch call flow of FIG. 6, wherein a softphone client (Anne's softphone) pulls a call from a twinned handset (Anne's primary mobile/handset). The call flow begins with an existing call in progress between Anne's softphone and Bob. At 1, Anne's softphone generates a SIP pull invite for a device switch that includes a URI for an device switch pull from her handset in the to field, (e.g., pull-VoLTE active@one.att.net) and an identifier for the softphone in the from field, (e.g., Anne's softphone). In an aspect, the identifier for Anne's softphone can include the GRUU of the softphone and/or the MSISDN tied to the GRUU of Anne's handset. The SIP pull invite also includes the session description protocol (SDP). Signaling step 2-6 demonstrate processing of the SIP pull invite through the SBC P-CSCF and the S-CFCF to TAS. TAS is depicted as a TAS original and TAS new to indicate that the same TAS processes both the original call and the switched call. The original TAS refers to the instance of the TAS that processes the original call and the new TAS refers to the instance of the TAS associated with processing the switched call. In an aspect, the original TAS and the new TAS can be combined in the SIP ladder diagram as one TAS for simplicity At 6, the new TAS realizes the original TAS has an active session between Anne's handset and Bob based on the SIP pull invite including the URI and a device switch indicator, and at 7, the new TAS generates a new SIP invite (or reformats the SIP pull invite) to include Bob in the to: field and Anne's softphone in the from field. This new or re-formatted invite is referred to as a re-invite because it is configured to re-invite Bob to continue the same call just with a new endpoint, Anne's softphone. Signaling steps 8-9 demonstrate sending and processing of the SIP re-invite from the new TAS to Bob. Signaling steps 11-12 depict sending of an SIP OK 200 response from Bob (directed to Anne's softphone) indicating acceptance of the re-invite. Upon receipt of the SIP OK 200 response from Bob by the original TAS, the original TAS generates and sends a BYE messages to Anne's handset, denoted in signaling steps 13-15. The BYE messages is a request for Anne's handset to end/drop the initial call with Bob. At 14, the BYE messages is received by Anne's handset which signals and causes Anne's handset to stop sending media to Bob.

The SIP ladder diagram 700 continues in FIG. 7B. At 16, Anne's handset sends an OK 200 message directed back to the original TAS that indicates Anne's handset has dropped the original call. Signaling steps 17-19 indicate processing and signaling of the OK 200 message from Anne's handset up to the original TAS. In response to receipt of the OK 200 message from Anne's handset, the original TAS relays the OK 200 message from Bob (indicating acceptance of the re-invite). Signaling steps 19-22 indicate processing and signaling of the OK 200 message from Bob to Anne's softphone. Anne's softphone accepts the call at 23 and sends an acknowledgment message indicating acceptance back to the original TAS in signaling steps 23-26. Then the media session is established between Anne's Softphone and Bob and the call continues.

Figure 8:
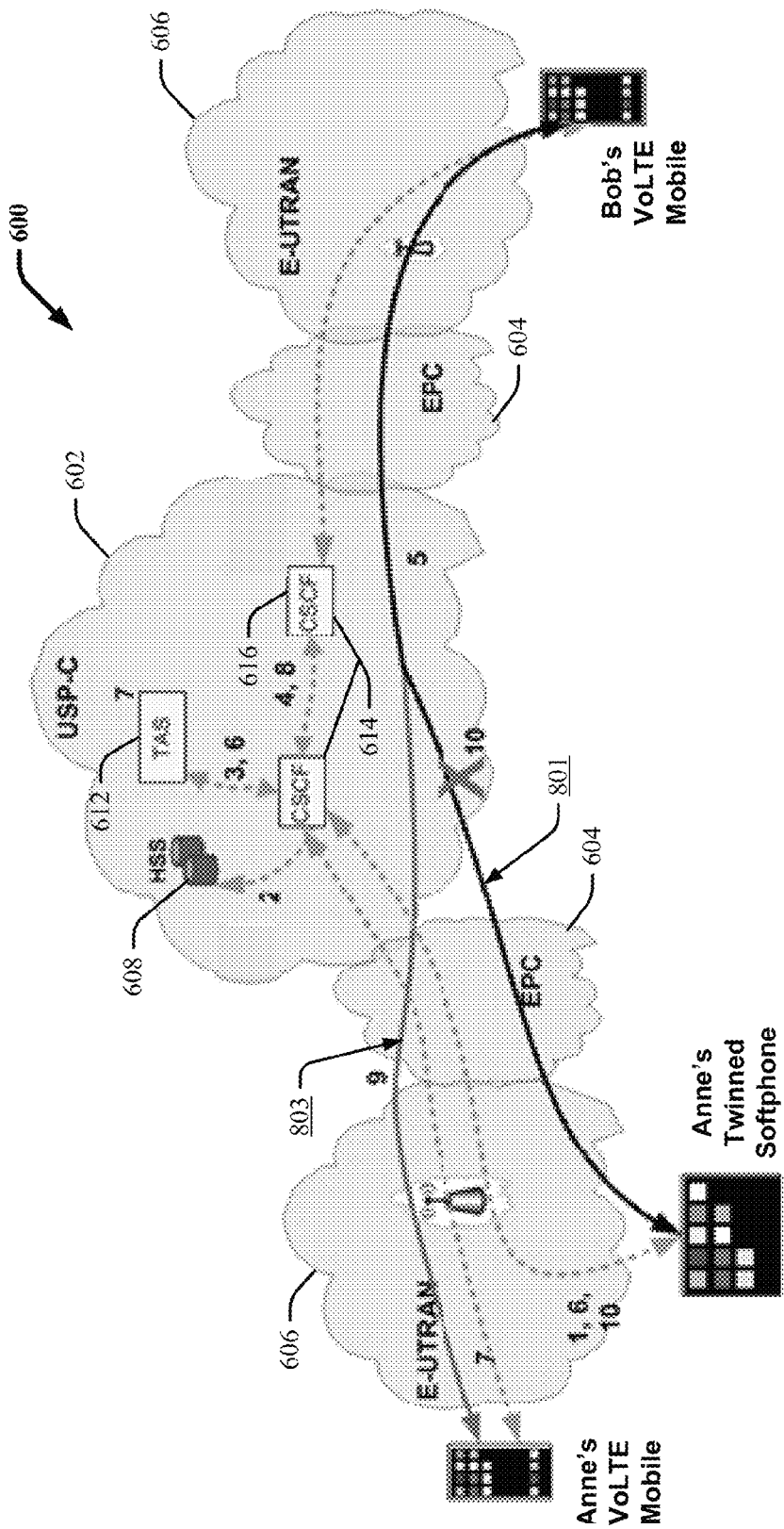
FIG. 8 presents another example call flow diagram for device switching over a telecommunications service provider network in accordance with aspects described herein.

FIG. 8 presents another example call flow diagram for device switching over telecommunications service provider network 600 in accordance with aspects described herein. Repetitive description of like elements employed in respective embodiments of systems, devices and methods described herein is omitted for sake of brevity.

Similar to the call flow described in FIG. 6, the example call flow depicted in FIG. 8 includes Anne with her primary VoLTE mobile device and her softphone device that have been registered for VoLTE and softphone services, respectively, from the telecommunications service provider, and twinned in accordance with aspects described herein. However, rather than depicting a pull scenario, the call flow depicted in FIG. 8 demonstrates a device switch push of an active call from Anne's twinned softphone to Anne's VoLTE mobile device, wherein the active call is originally established as VoIP call (e.g., voice or voice and video) between Anne's twinned softphone device and Bob's VoLTE mobile device. The dashed lines represent signaling (e.g., SIP signaling).

The call flow begins at 1 with Anne making a voice or voice and video call from her twinned smartphone device to Bob. At 2, the call enters the CSCF 616 which quires the HSS 608 for services subscribed to by Anne. At 3, TAS is invited to process call based on Anne's subscribed to services (including VoLTE voice and/or VoLTE video). At 4, TAS sends an invite to the called party, Bob's VoLTE mobile device (requesting voice and video resources) which answers. At 5, the call is connected and voice and video paths are established between Anne's twinned softphone and Bob's VoLTE mobile device, represented by call signal line 801.

At 6, Anne opens a device switch application associated with or included with the softphone client application of her twinned softphone device. Using the device switch application, Anne selects an option to push the call from her softphone device to her VoLTE mobile device. In response to the selection, the device switch application generates and sends an SIP refer message with the MSISDN of her VoLTE mobile device to TAS. The push device switch request is sent to TAS via the IMS CSCF and it is routed to the TAS by the initial filter criteria (IFC) in Anne's service profile (e.g., associated with her user account) provided in the HSS. At 7, TAS generates and sends an SIP invite to Anne's VoLTE mobile device which she answers when alerted. At 8, TAS generates and sends an SIP re-invite to Bob's VoLTE mobile inviting Bob's VoLTE mobile device to re-establish the active call with Anne's twinned VoLTE mobile device. At 9, in response to acceptance by Bob's VoLTE device, voice and video bearer paths are established between Bob's VoLTE device and Anne's VoLTE mobile device. The new connection is represented by line 803. Then at 10, Anne's twinned softphone device drops the original call (denoted by the X mark).

Figure 9A:
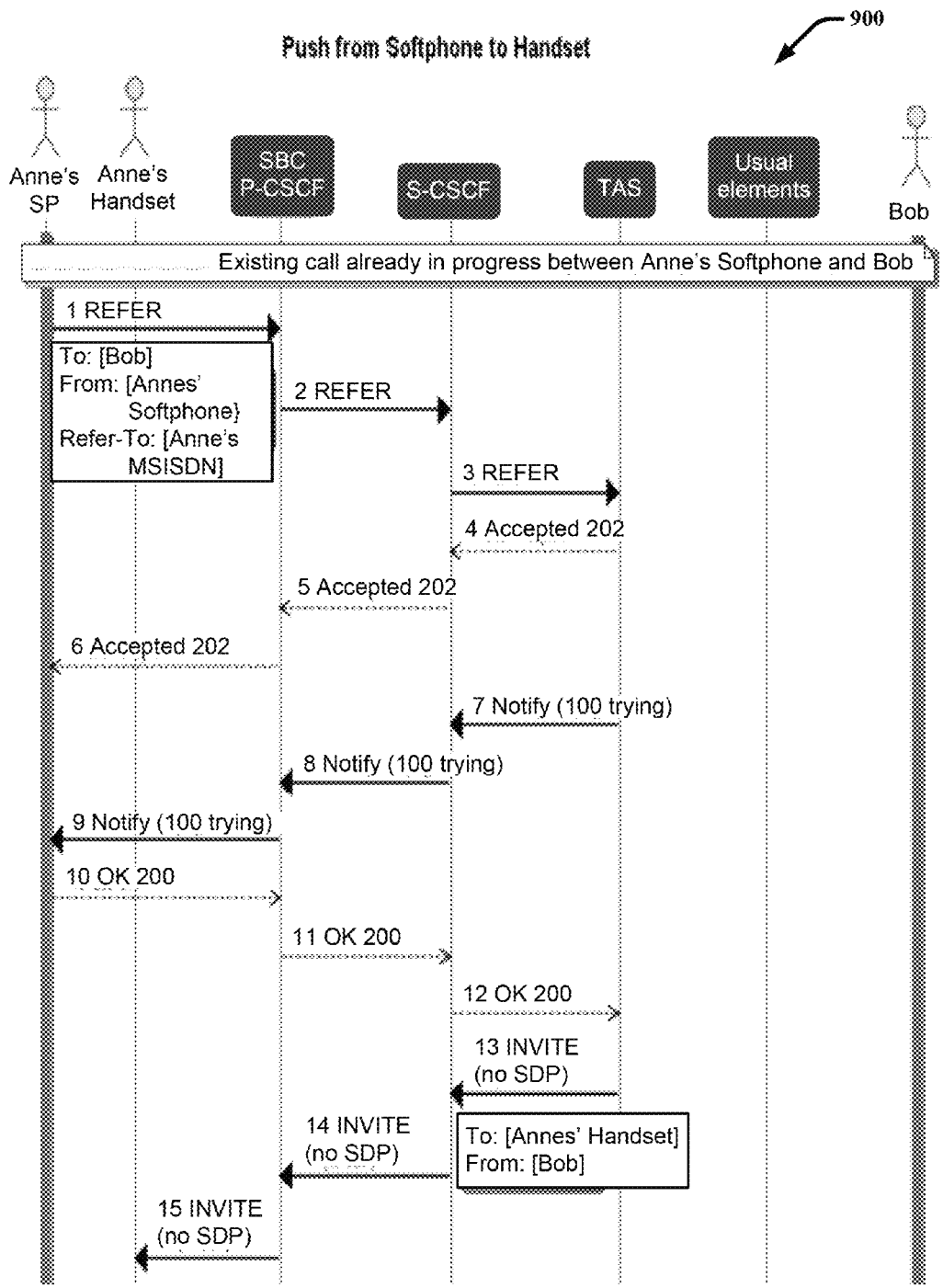
FIG. 9A-9C present another example session initiation protocol (SIP) ladder diagram for the call flow in accordance with aspects described herein.
Figure 9B:
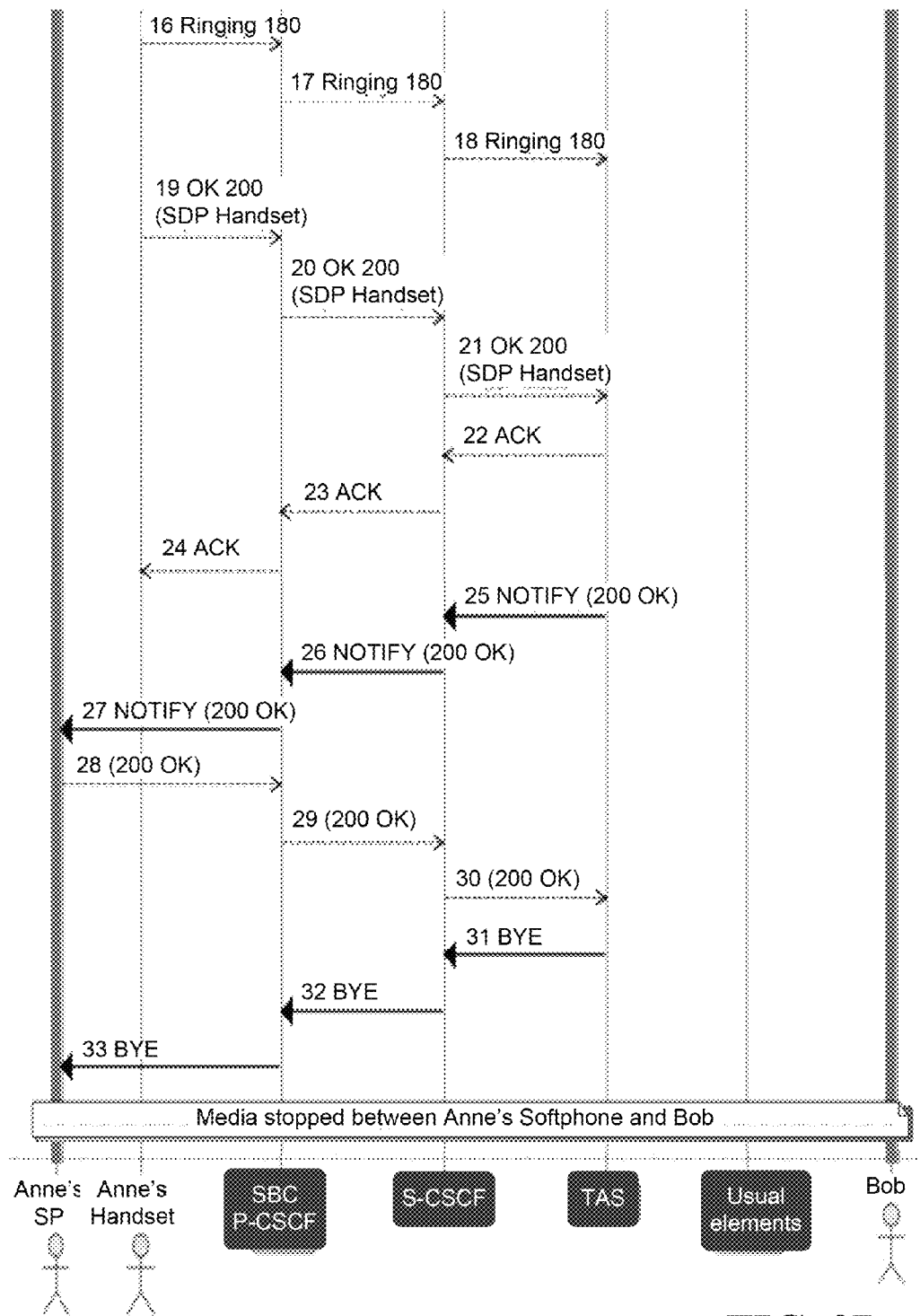
Figure 9C:
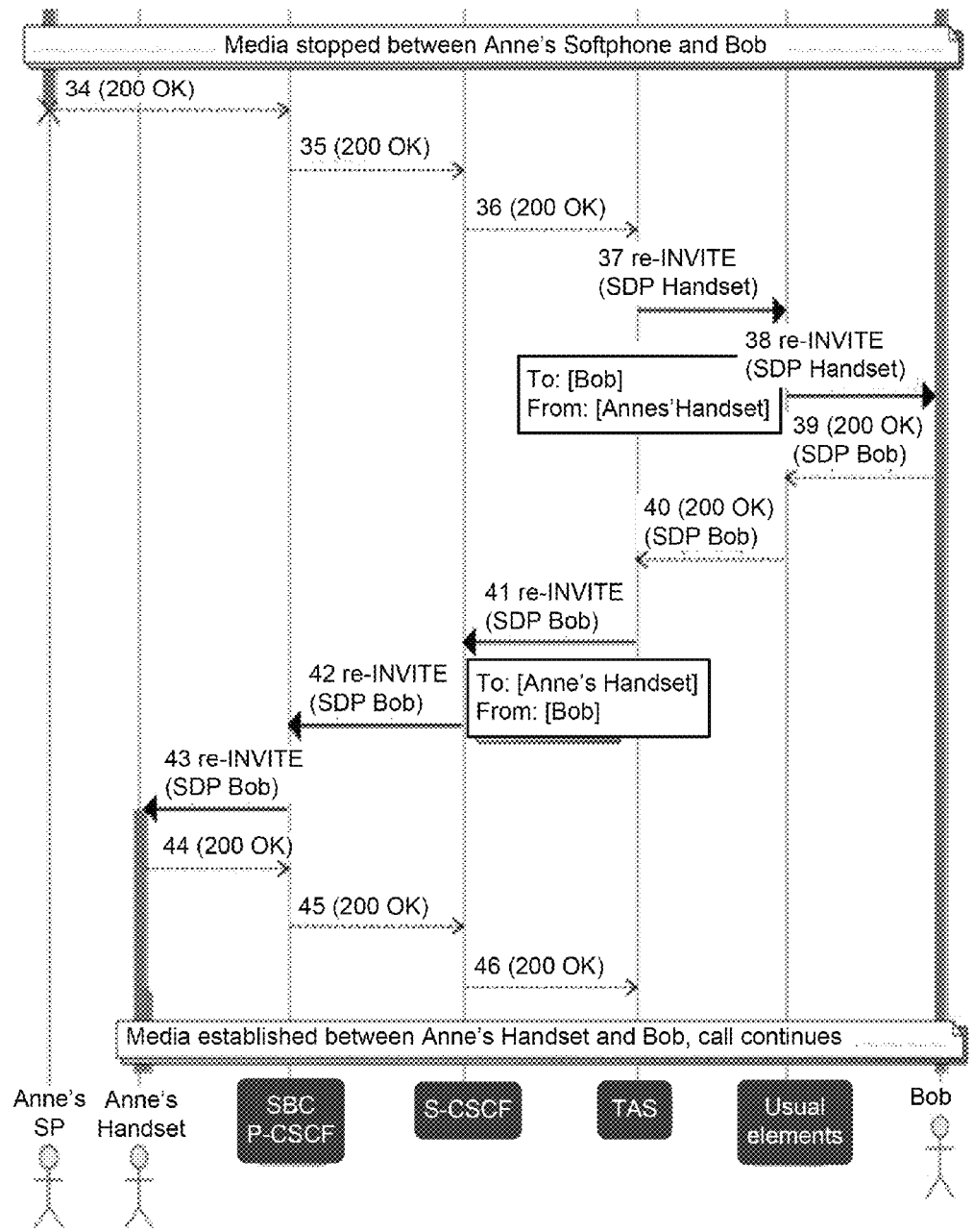

FIGS. 9A-9C presents an example SIP ladder diagram for the call flow described in call flow diagram 900 in accordance with aspects described herein. Repetitive description of like elements employed in respective embodiments of systems, devices and methods described herein is omitted for sake of brevity.

SIP ladder diagram 900 provides SIP signaling for the device switch call flow of FIG. 8, wherein a softphone client, Anne's softphone, pushes a call to the twinned primary mobile/handset. The call flow begins with an existing call in progress between Anne's softphone and Bob. At 1, Anne's softphone generates a SIP push refer for a device switch that is directed to Bob, from Anne's softphone, and includes a refer-to Anne's MSISDN, indicating the request to push the call to Anne's handset that assigned the MSISDN. With signaling steps 2-3, the SIP push refer is signaled up to TAS via the SBC P-CSCF and the S-CSCF. Signaling steps 4-9 indicate signaling by TAS to Anne's softphone indicating acceptance and authorization of the device switch. Signaling steps 10-12 indicate confirmation, by Anne's softphone of the device switch acceptance. At 13, TAS generates and sends an SIP re-invite to Anne's handset, from Bob, to reestablish the media session with Bob.

SIP ladder diagram 900 continues in FIG. 9B. At 16-18, in response to the re-invite, Anne's handset signals a ringing 180 message back to the TAS and in steps 19-21 signals an OK 200 message back to the TAS. At 22-24, TAS sends an ACK (acknowledgment) back to Anne's Handset regarding receipt and acknowledgment of the ringing 180 message. At 25-27, TAS sends a notify response to the 200 OK message to Anne's softphone. Anne's softphone communicates back to the TAS in 28-30, and in 31-33, TAS sends a BYE message to Anne's softphone requesting the softphone to end/drop the original call. In turn, Anne's softphone drops the call and stops sending media to Bob.

SIP ladder diagram 900 continues in FIG. 9C. At 34-36 Anne's softphone sends on OK 200 message back to the TAS indicating it has stopped sending media to Bob. At 37, in response to the OK 200 message TAS generates an SIP re-invite to Bob from Anne's handset, and sends it to Bob at 38. At 39-49, Bob accepts the re-invite and responds with an OK 200 with SDB for Bob to TAS. At 41, TAS generates and sends a SIP re-invite to Anne's handset from Bob with Bob's SDP. At 42 and 43, this SIP re-invite is sent to and received by Anne's handset. At 44, Anne's handset accepts the re-invite and responds, at 45-46 with an OK 200 message back to TAS affirming the acceptance. Then the media session is established between Anne's handset and bob and the call continues.

Figure 10:
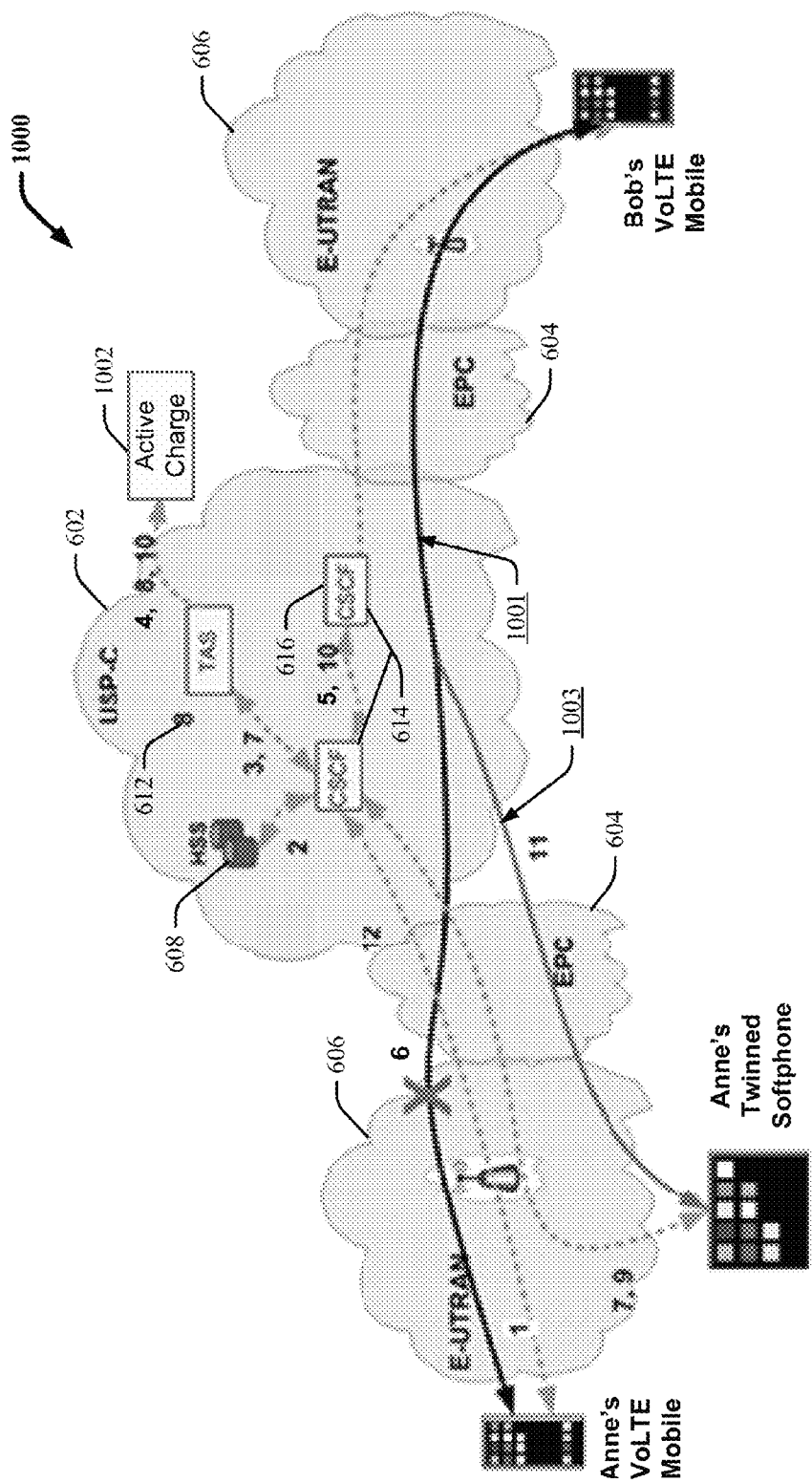
FIG. 10 presents another example call flow diagram for device switching over a telecommunications service provider network in accordance with aspects described herein.

FIG. 10 presents an example call flow diagram for device switching over telecommunications service provider network 1000 in accordance with aspects described herein. Telecommunications service provider network 1000 is similar to telecommunications service provider network 1000 with the addition of active charge server 1002. Repetitive description of like elements employed in respective embodiments of systems, devices and methods described herein is omitted for sake of brevity.

Similar to the call flow described in FIG. 6, the example call flow depicted in FIG. 10 includes Anne with her primary VoLTE mobile device and her softphone device that have been registered for VoLTE and softphone services, respectively, from the telecommunications service provider, and twinned in accordance with aspects described herein. The call flow depicted in FIG. 8 also demonstrates a device switch pull of an active call from Anne's VoLTE mobile device to Anne's twinned softphone, wherein the active call is originally established as VoLTE call (e.g., voice or voice and video) between Anne's twinned softphone device and Bob's VoLTE mobile device. However, unlike the flow depicted in FIG. 6, the original active VoLTE call is a prepaid call.

The call flow begins at 1 with Anne making a voice or voice and video call from her VoLTE mobile device using VoLTE to Bob. At 2, the call enters the CSCF 616 which quires the HSS 608 for services subscribed to by Anne. At 3, TAS is invited to process call based on Anne's subscribed to services (including VoLTE voice and/or VoLTE video). At 4, TAS queries the active charge server for Anne's prepaid balance to determine whether the call is authorized to be made. At 5, in response to authorization, TAS sends an invites to the called party, Bob's VoLTE mobile device (requesting voice and video resources) which answers. At 6, the call is connected and voice and video paths are established between Anne's VoLTE mobile device and Bob's VoLTE mobile device, represented by call signal line 1001.

At 7, Anne picks up her twinned softphone device (e.g., her tablet PC) and opens a device switch application associated with or included with the sofphone client application. Using the device switch application, Anne selects an option to pull the call from her VoLTE mobile device. In response to the selection, the device switch application generates and sends an SIP invite with a device switch request URI to TAS. The device switch request is sent to TAS via the IMS CSCF and it is routed to the TAS by the initial filter criteria (IFC) in Anne's service profile (e.g., associated with her user account) provided in the HSS. At 8, TAS searches for an existing active call established on Anne's VoLTE mobile device (when the existing call is not identified in the SIP device switch request message). In addition TAS sends an Ro interface to the Active Charge server to determine if the new call is permitted based on Anne's prepaid balance. At 9, in response to authorization TAS establishes a session to Anne's twinned softphone via the SIP invite of Anne's prepaid. At 10, TAS generates and sends an SIP re-invite to Bob's VoLTE mobile inviting Bob's VoLTE mobile device to re-establish the active call with Anne's twinned softphone device. TAS further sends device switch Ro event to the active charge server 1002 to signal that the call has been moved to Anne's softphone. At 11, in response to acceptance by Bob's VoLTE device, voice and video bearer paths are established between Bob's VoLTE device and Anne's twinned softphone device. The new connection is represented by line 1003. Then at 12, Anne's VoLTE mobile device drops the original call (denoted by the X mark).

Figure 11:
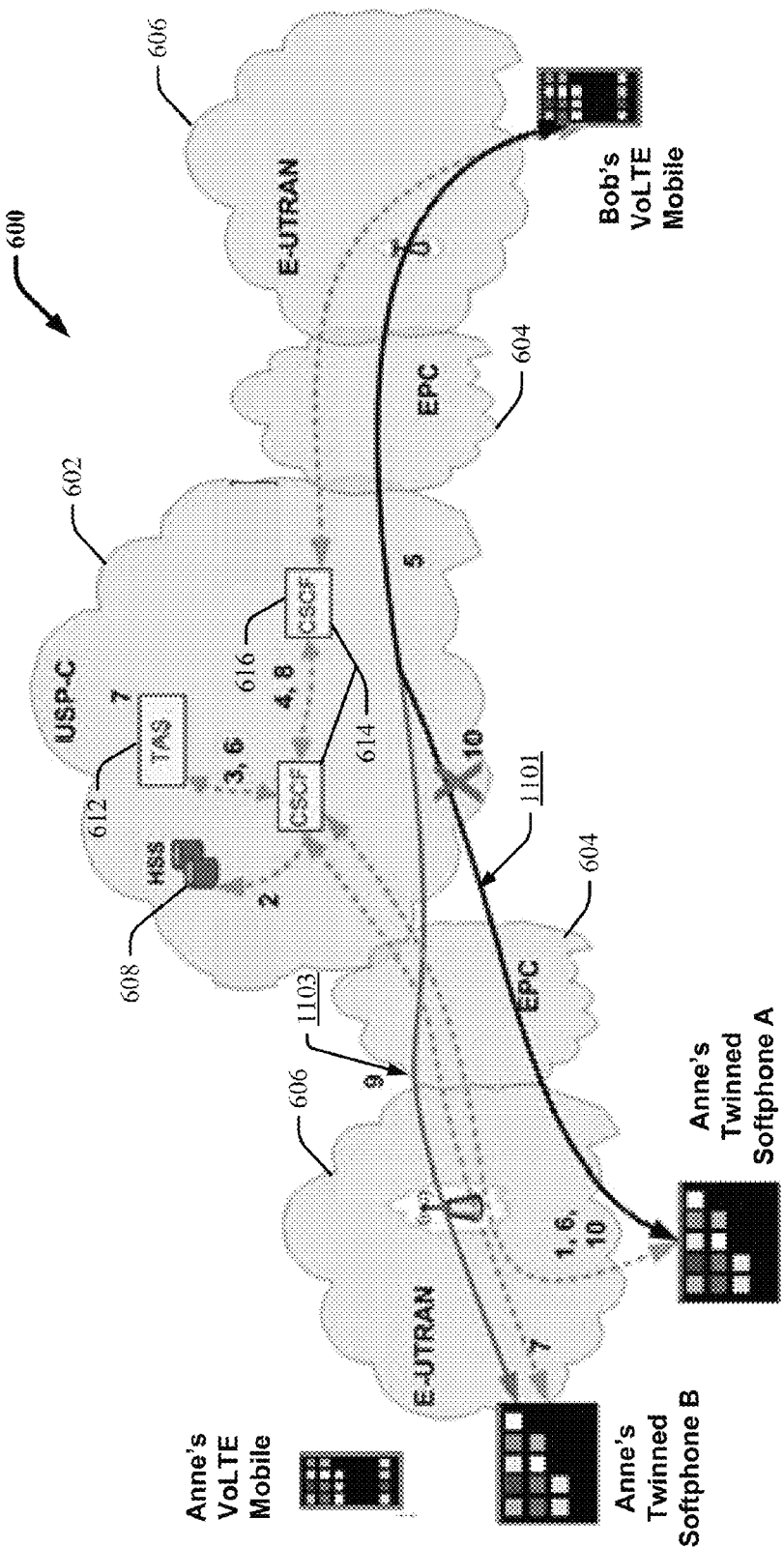
FIG. 11 presents another example call flow diagram for device switching over a telecommunications service provider network in accordance with aspects described herein.

FIG. 11 presents an example call flow diagram 1200 for device switching over a telecommunications service provider network in accordance with aspects described herein. Repetitive description of like elements employed in respective embodiments of systems, devices and methods described herein is omitted for sake of brevity.

Similar to the call flow described in FIG. 6, with the example call flow depicted in FIG. 11, Anne has with a primary VoLTE mobile device that has been registered for VoLTE from the telecommunications service provider. In addition, Anne has two different softphones, Softphone A and softphone B which have registered with the telecommunications service provider and twinned with one another and Anne's primary VoLTE mobile device (e.g., such that each of the three devices share the MSISDN of the primary mobile VoLTE device) and twinned in accordance with aspects described herein. The call flow depicted in FIG. 11 demonstrates a device switch push, by softphone A, of an active call from softphone A to softphone B, wherein the active call is originally established as a voice or voice and video call between Anne's softphone A and Bob's VoLTE mobile device.

The call flow begins at 1 with Anne making a voice or voice and video call from her softphone A device to Bob. At 2, the call enters the CSCF 616 which quires the HSS 608 for services subscribed to by Anne. At 3, TAS is invited to process call based on Anne's subscribed to services (including VoLTE voice and/or VoLTE video). At 4, TAS sends an invites to the called party, Bob's VoLTE mobile device (requesting voice and video resources) which answers. At 5, the call is connected and voice and video paths are established between Anne's softphone A device and Bob's VoLTE mobile device, represented by call signal line 1101.

At 6, Anne opens a device switch application associated with or included with the softphone client application of softphone A. Using the device switch application, Anne selects an option to push the call from softphone A to softphone B. In response to the selection, the device switch application generates and sends an SIP refer message with the GRUU of softphone B. The push device switch request is sent to TAS via the IMS which routes the request to TAS. At 7, TAS generates and sends an SIP invite to Anne's softphone B which she answers when alerted. At 8, TAS generates and sends an SIP re-invite to Bob's VoLTE mobile inviting Bob's VoLTE mobile device to re-establish the active call with Anne's softphone B. At 9, in response to acceptance by Bob's VoLTE device, voice and video bearer paths are established between Bob's VoLTE device and Anne's softphone B. The new connection is represented by line 1103. Then at 10, Anne's softphone A device drops the original call (denoted by the X mark).

Figure 12:
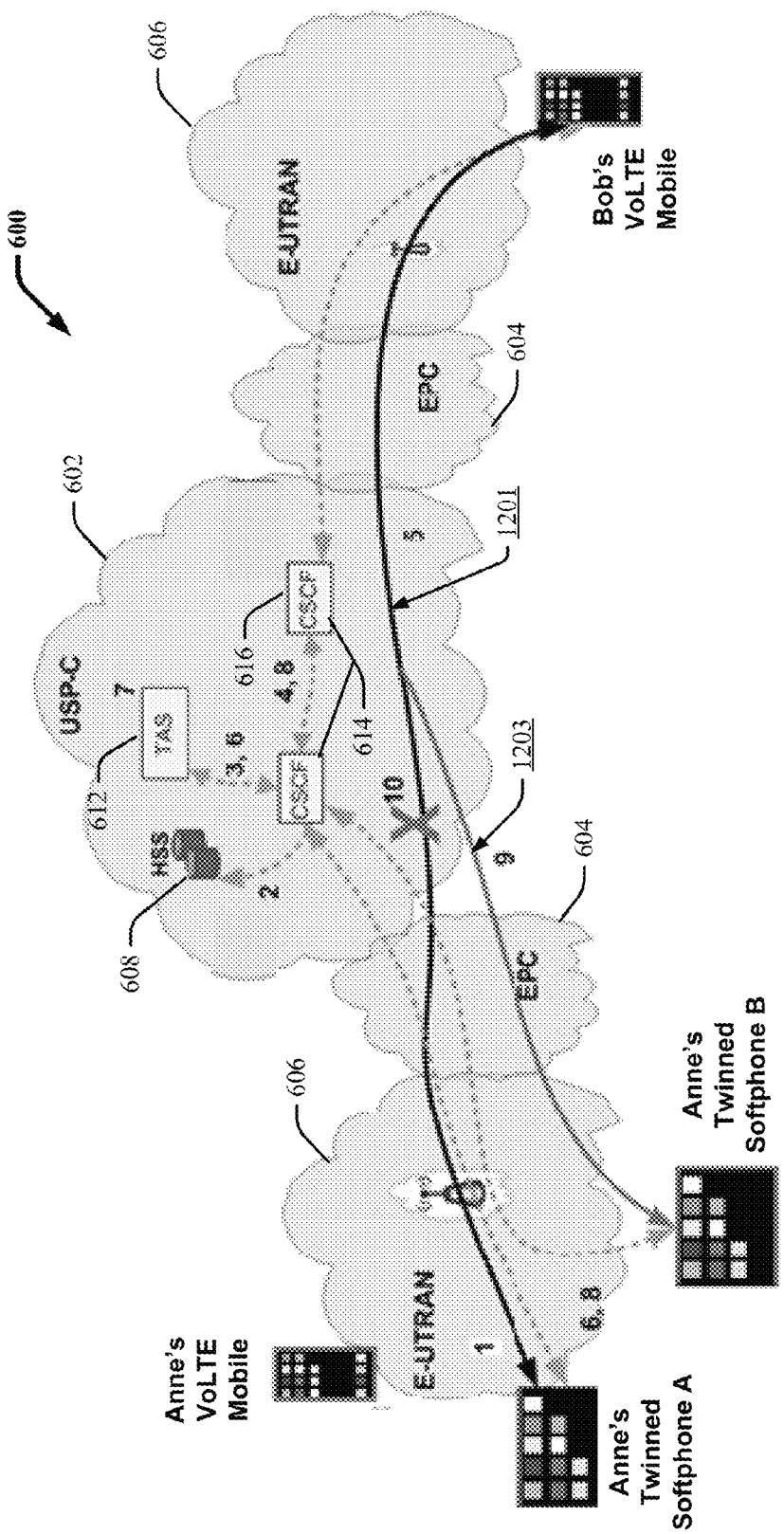
FIG. 12 presents another example call flow diagram for device switching over a telecommunications service provider network in accordance with aspects described herein.

FIG. 12 presents another example call flow diagram for device switching over telecommunications service provider network 600 in accordance with aspects described herein. Repetitive description of like elements employed in respective embodiments of systems, devices and methods described herein is omitted for sake of brevity.

Similar to the call flow described in FIG. 11, with the example call flow depicted in FIG. 12, Anne has with a primary VoLTE mobile device that has been registered for VoLTE from the telecommunications service provider. In addition, Anne has two different softphones, Softphone A and softphone B which have registered with the telecommunications service provider and twinned with one another and Anne's primary VoLTE mobile device (e.g., such that each of the three devices share the MSISDN of the primary mobile VoLTE device. and twinned in accordance with aspects described herein. The call flow depicted in FIG. 12 demonstrates a device switch pull, by softphone B, of an active call from softphone A to softphone B, wherein the active call is originally established as a voice or voice and video call between Anne's softphone A and Bob's VoLTE mobile device.

The call flow begins at 1 with Anne making a voice or voice and video call from her softphone A device to Bob. At 2, the call enters the CSCF 616 which quires the HSS 608 for services subscribed to by Anne. At 3, TAS is invited to process call based on Anne's subscribed to services (including VoLTE voice and/or VoLTE video). At 4, TAS sends an invites to the called party, Bob's VoLTE mobile device (requesting voice and video resources) which answers. At 5, the call is connected and voice and video paths are established between Anne's softphone A device and Bob's VoLTE mobile device, represented by call signal line 1201.

At 6, Anne picks up softphone device B and opens a device switch application associated with or included with the softphone client application. Using the device switch application of softphone B, Anne selects an option to pull the call from her 'active softphone' (which may or may not be identified in the softphone UI as softphone A). In response to the selection, the device switch application generates and sends an SIP invite with a 'pull softphone active' device switch request URI to TAS. The device switch request is sent to TAS via the IMS CSCF and it is routed to the TAS by the initial filter criteria (IFC) in Anne's service profile (e.g., associated with her user account) provided in the HSS. At 7, TAS searches for an existing active call established on one of Anne's twinned softphones (when the existing call is not identified in the SIP device switch request message, because only one of Anne's softphone can have an active call at a time). In another aspect, the existing active call on Anne's softphone A can be identified in the SIP device switch request message. At 8, TAS generates and sends an SIP re-invite to Bob's VoLTE mobile inviting Bob's VoLTE mobile device to re-establish the active call with Anne's softphone device B. At 9, in response to acceptance by Bob's VoLTE device, voice and video bearer paths are established between Bob's VoLTE device and Anne's softphone B. The new connection is represented by line 1203. Then at 10, Anne's Softphone A drops the original call (denoted by the X mark).

FIGS. 13-16 illustrate a flow diagram and/or method in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 13:
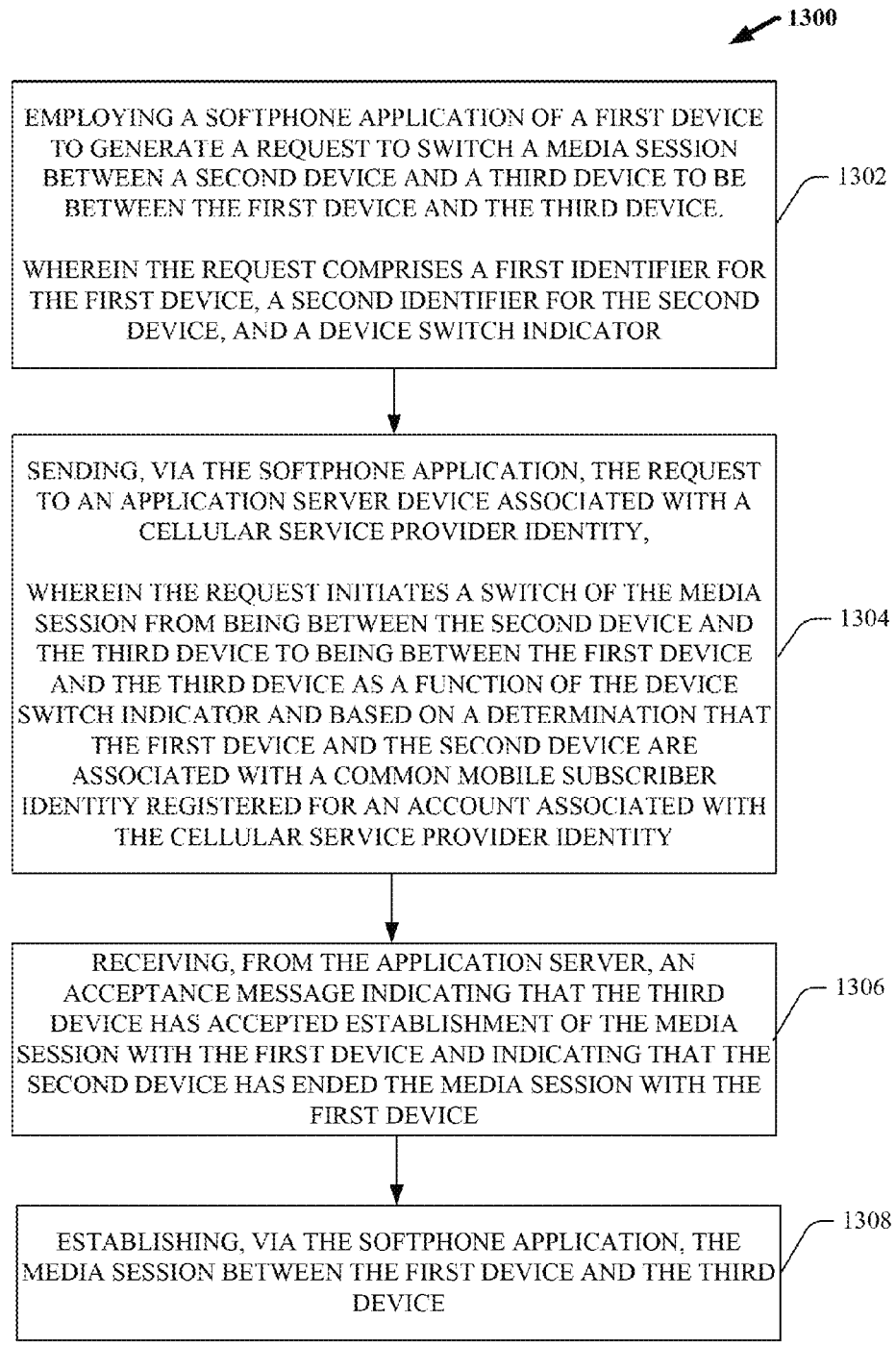
FIG. 13 provides an example flow diagram of a method for seamless movement of active media sessions between twinned communication devices in accordance with aspects and embodiments described herein.

Referring now to FIG. 13, illustrated is an example method 1300 for seamless movement of media sessions between twinned communication devices in accordance with aspects and embodiments described herein. As an example, method 1300 can be implemented by a UE (e.g., UE 112 or Anne's tablet PC) having a softphone client (e.g., softphone client 114 or Anne's softphone A) installed thereon that has been twinned with a primary mobile device (e.g., primary mobile device 110 or Anne's handset) of a user (e.g., Anne) in association with a user account established by the user with a telecommunications service provider entity of telecommunications service provider network (e.g., network 120). Establishment of the user account includes registration for cellular services on the primary mobile device and assignment of a mobile subscriber identity/identifier (e.g., an MSISDN) to the user account/primary mobile device. The user account also includes registration for softphone services, provided by the telecommunications service provider entity via the telecommunications service provider network 120 (and the like), at the user's softphone client 114. In an aspect, the cellular services includes VoLTE service for the primary mobile device, wherein the telecommunications service provider network includes/employs a VoLTE network.

At 1302, a softphone application, provided on a first device, to generate a request to switch a media session between a second device and a third device to be between the first device and the third device. The request includes a first identifier for the first device, a second identifier for the second device, and a device switch indicator. For example, the first device can include Anne's softphone A (in response to request input from Anne) provided on her tablet PC, the second device can include a twinned device of Anne's (e.g., Anne's handset or another twinned softphone B), and the third device can include another party on the call (e.g., Bob). In accordance with this example, the request can include a request an SIP invite to pull a call (e.g., a voice call or a voice and video call) from Anne's twinned second device to her softphone. In an aspect, the device switch indicator is included in the SIP invite header. In another aspect, the second identifier for the second device and/or the device switch indicator are embodied in a specialized URI for a softphone device switch (when the second device is Anne's softphone B) or a handset device switch (when the second device is Anne's handset) included in the request. The URI can also indicate whether the media session to be pulled is active or on-hold and indicate it is a pull from a twinned softphone of the user or the user's twinned handset.

In an aspect, a specific identifier (e.g., a GRUU) of the particular softphone is not necessary in the URI when softphone services rules implemented by the telecommunications/cellular service provider allow only one active softphone of a user's set of twinned softphones at a time. Accordingly, based on an identifier for the requesting softphone A, TAS can identify the only active twinned softphone. Similarly, a specific identifier (e.g., the MSISDN) of the handset is not necessary because a user can have only one handset in the twinned group. Accordingly, based on an identifier for the requesting softphone A, TAS can identify the user's twinned handset.

At 1304, the softphone application of the first device sends the request to an application server device (e.g., TAS) associated with a cellular service provider identity. The request initiates a switch of the media session from being between the second device and the third device to being between the first device and the third device as a function of the device switch indicator and based on a determination that the first device and the second device are associated with a common mobile subscriber identity registered for an account associated with the cellular service provider identity, (e.g., based on determination by request processing component 404 that the first device and the third device are twinned and share the same MSISDN or mobile number).

At 1306, an acceptance message is received, from the application server at the softphone application, indicating that the third device has accepted establishment of the media session with the first device and indicating that the second device has ended the media session with the first device. Then at 1308, the media session is established between the first device and the third device via the softphone application of the first device.

Figure 14:
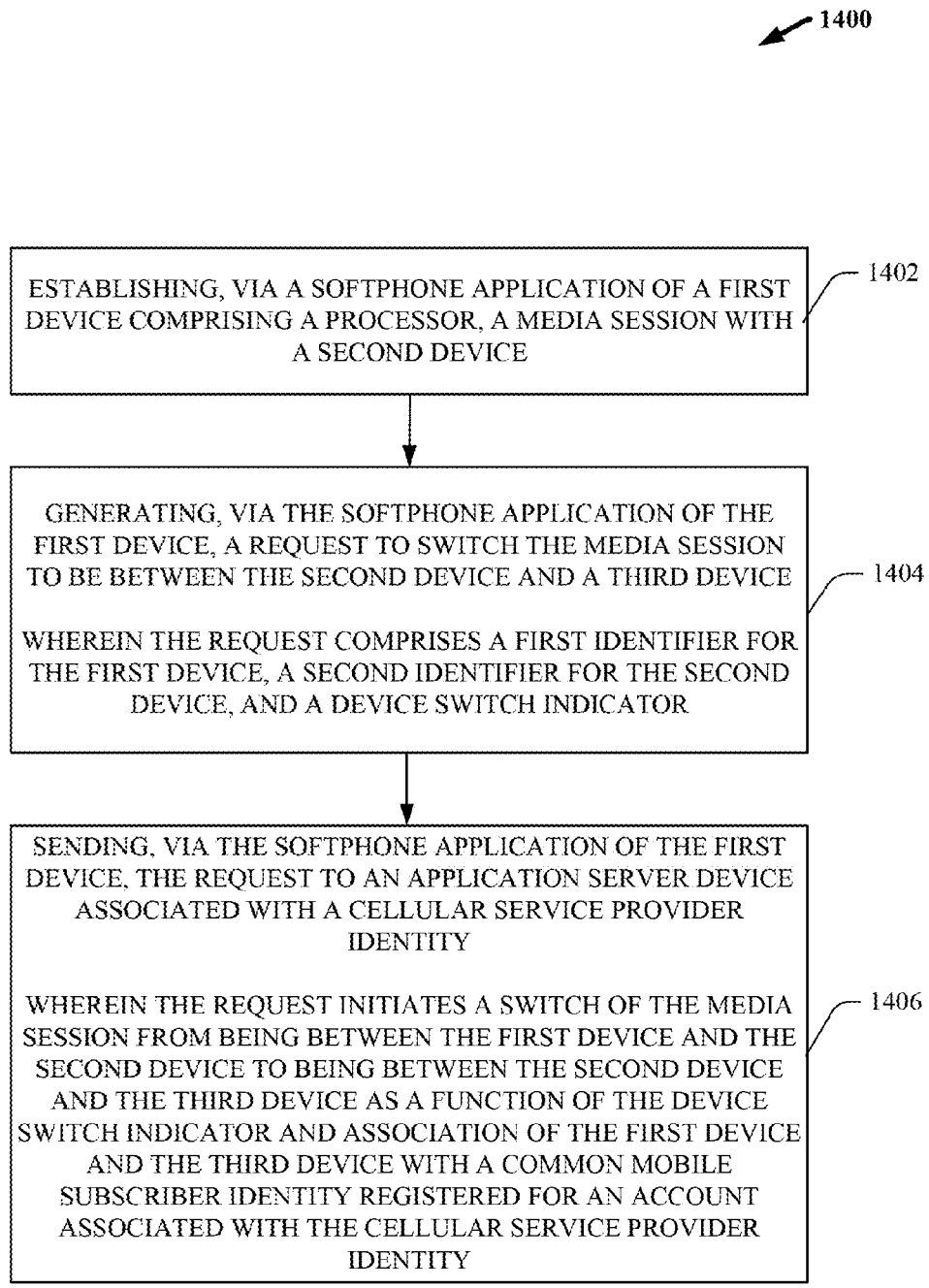
FIG. 14 provides an example flow diagram of another method for seamless movement of active media sessions between twinned communication devices in accordance with aspects and embodiments described herein.

FIG. 14 illustrates another example method 1400 for seamless movement of media sessions between twinned communication devices in accordance with aspects and embodiments described herein. Similar to method 1300, method 1400 can be implemented by a UE (e.g., UE 112 or Anne's tablet PC) having a softphone client (e.g., softphone client 114 or Anne's softphone A) installed thereon that has been twinned with a primary mobile device (e.g., primary mobile device 110 or Anne's handset) of a user (e.g., Anne) in association with a user account established by the user with a telecommunications service provider entity of telecommunications service provider network (e.g., network 120).

At 1402, a softphone application of a first device comprising a processor establishes a media session with a second device. For example, Anne's softphone A can call Bob and start a voice or voice and video call. At 1404, the softphone application of the first device generates a request to switch the media session to be between the second device and a third device. The request can include a first identifier for the first device, a third identifier for the third device, and a device switch indicator. For example, if the third device is Anne's handset, the request can include an SIP refer message including the MSISDN for Anne's twinned handset. In an aspect, the device switch indicator is embodied in the SIP refer message including the MSISDN for Anne's twinned handset. In another example, if the third device is another twinned softphone, softphone B, the request can include an SIP refer message including the GRUU for softphone B. In an aspect, the device switch indicator is embodied in the SIP refer message including the GRUU for Anne's twinned softphone B. In other aspects, the device switch indicator is included in the SIP refer header.

At 1406, the softphone application of the first device sends the request to an application server device (e.g., TAS) associated with a cellular service provider identity. The request initiates a switch of the media session from being between the first device and the second device to being between the second device and the third device as a function of the device switch indicator and association of the first device and the third device with a common mobile subscriber identity (e.g., Anne and/or the twinned device group's shared MSISDN) registered for an account associated with the cellular service provider identity.

Figure 15:
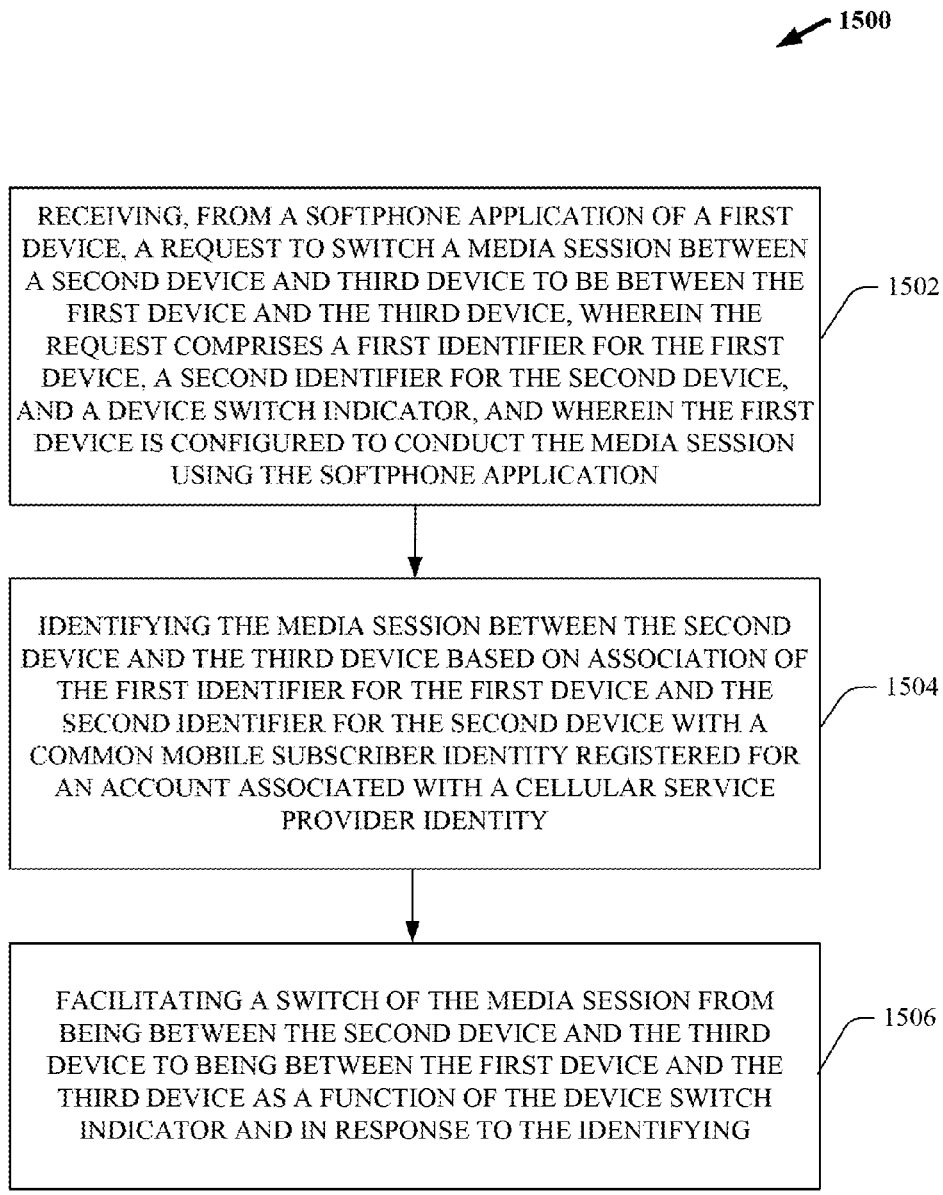
FIG. 15 provides an example flow diagram of another method for seamless movement of active media sessions between twinned communication devices in accordance with aspects and embodiments described herein.

FIG. 15 illustrates another example method 1500 for seamless movement of media sessions between twinned communication devices in accordance with aspects and embodiments described herein. As an example, method 1500 can be implemented by an application server (e.g., TAS) of a telecommunications service provider that is configured to employ an IMS network to facilitate provision of cellular (e.g., via a VoLTE network) and softphone services.

At 1502, a request is received from a softphone application of a first device, to switch a media session between a second device and third device to be between the first device and the third device, wherein the request comprises a first identifier for the first device, a second identifier for the second device, and a device switch indicator, and wherein the first device is configured to conduct the media session using the softphone application. At 1504, the media session between the second device and the third device is identified based on association of the first identifier for the first device and the second identifier for the second device with a common mobile subscriber identity registered for an account associated with a cellular service provider identity. At 1506, a switch of the media session from being between the second device and the third device to being between the first device and the third device is facilitated (e.g., using SIP signaling between the first, second and third devices) as a function of the device switch indicator and in response to the identifying.

Figure 16:
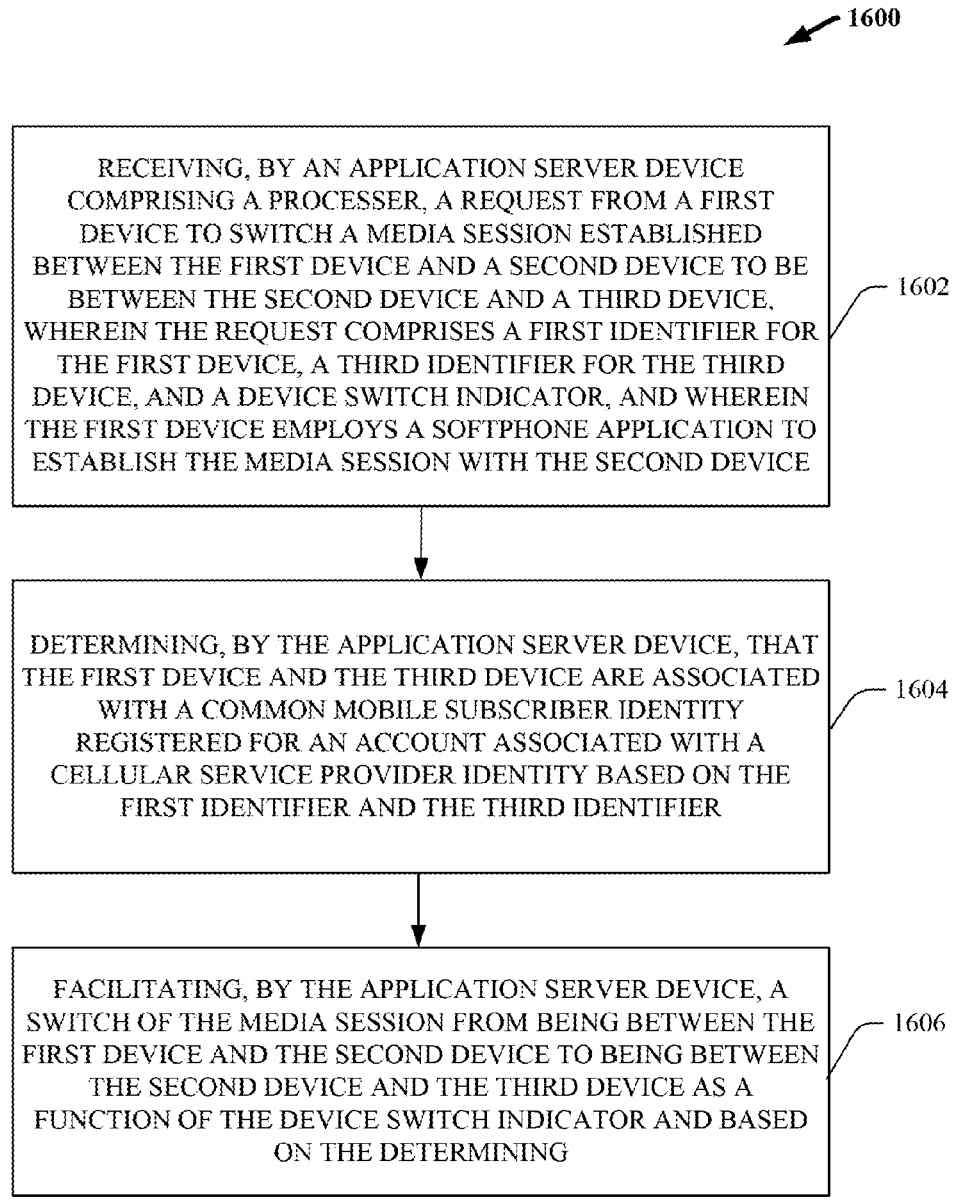
FIG. 16 provides an example flow diagram of another method for seamless movement of active media sessions between twinned communication devices in accordance with aspects and embodiments described herein.

FIG. 16 illustrates another example method 1600 for seamless movement of media sessions between twinned communication devices in accordance with aspects and embodiments described herein. As an example, method 1600 can be implemented by an application server (e.g., TAS) of a telecommunications service provider that is configured to employ an IMS network to facilitate provision of cellular (e.g., via a VoLTE network) and softphone services.

At 1602, an application server device comprising a processer (e.g., TAS) receives a request from a first device to switch a media session established between the first device and a second device to be between the second device and a third device, wherein the request comprises a first identifier for the first device, a third identifier for the third device, and a device switch indicator, and wherein the first device employs a softphone application to establish the media session with the second device. At 1604, the application server device determines that the first device and the third device are associated with a common mobile subscriber identity registered for an account associated with a cellular service provider identity based on the first identifier and the third identifier. At 1606, the application server device then facilitates a switch of the media session from being between the first device and the second device to being between the second device and the third device as a function of the device switch indicator and based on the determining.

Figure 17:
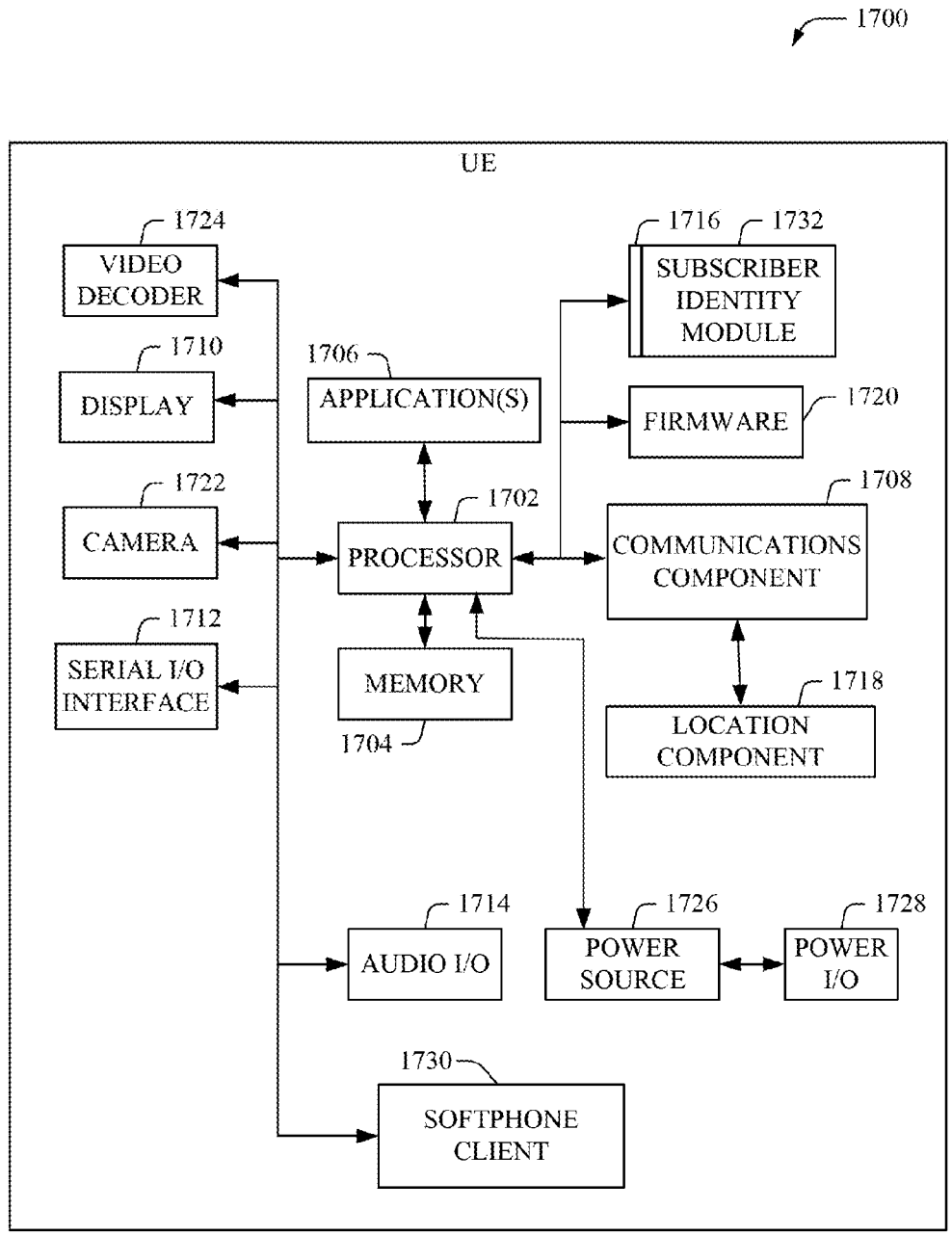
FIG. 17 illustrates an example block diagram of a user equipment suitable for cloud-based device twinning.
Figure 18:
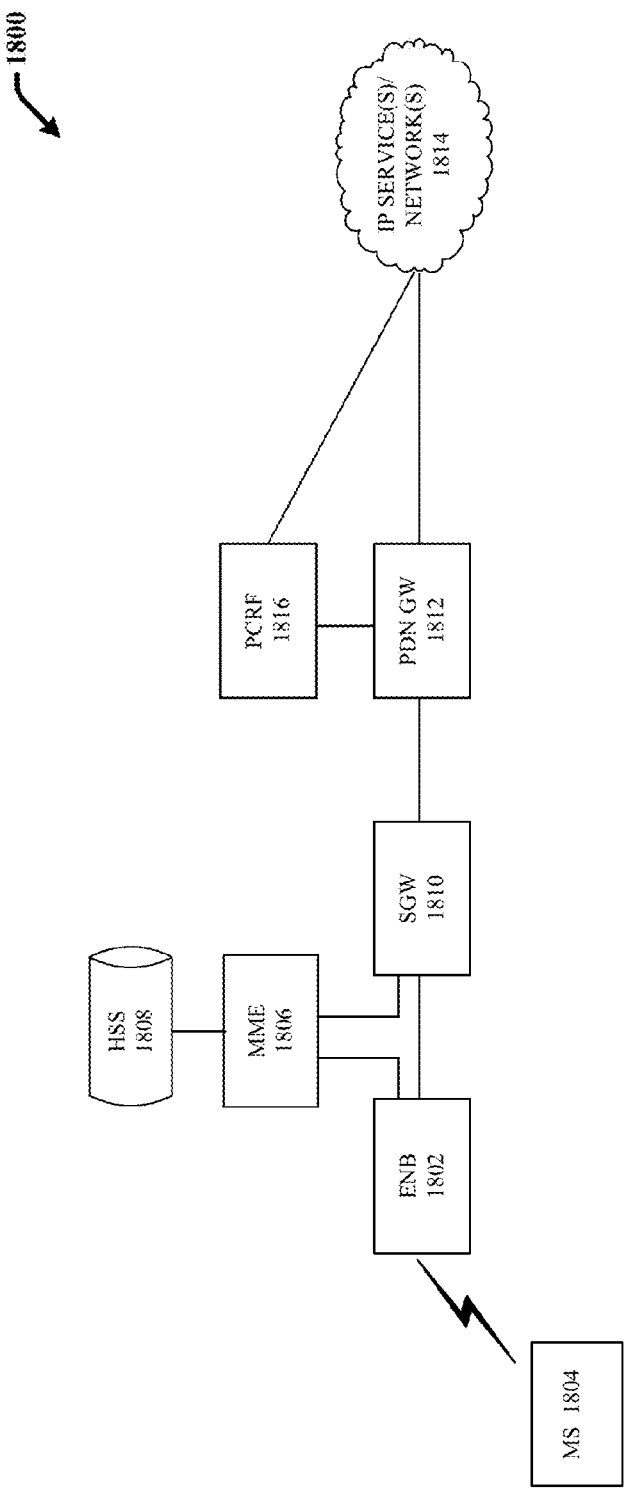
FIG. 18 illustrates a Long Term Evolution (LTE) network architecture that can employ the disclosed architecture

To provide further context for various aspects of the subject specification, FIGS. 17 and 18 illustrate, respectively, a block diagram of an example user equipment 1100 that facilitates device switching and a wireless communication environment 1200, with associated components for operation and/or management of device switching in accordance with aspects described herein.

Referring now to FIG. 17, there is illustrated a block diagram of a UE 1700 that facilitates device switching in accordance with the subject specification. Moreover, the UE 1700 can be substantially similar to and include functionality associated with UE $112_1$-$112_N$, and primary mobile device 110 described herein. In one aspect, the UE 1700 can include a processor 1702 for controlling all onboard operations and processes. A memory 1704 can interface to the processor 1702 for storage of data and one or more applications 1706 being executed by the processor 1702. A communications component 1708 can interface to the processor 1702 to facilitate wired/wireless communication with external systems (e.g., via communication network 104). The communications component 1708 can interface to a location component 1718 (e.g., GPS transceiver) that can facilitate location detection of the UE 1700.

The UE 1700 can include a display 1710 (e.g., screen and/or touch screen) for displaying received content (and/or content to be transferred) and/or for displaying text information related to operating and using the device features. A serial I/O interface 1712 is provided in communication with the processor 1702 to facilitate serial communication (e.g., USB, and/or IEEE 1394) via a hardwire connection. Audio capabilities are provided with an audio I/O component 1714, which can include a speaker for the output of audio signals related to, for example, recorded data or telephony voice data, and a microphone for inputting voice signals for recording and/or telephone conversations.

Further, the UE 1700 can include a slot interface 1716 for accommodating a subscriber identity module (SIM) 1732. In an aspect, a unique CTN (e.g., an MSISDN where UE embodies primary mobile device 110) can be associated with the SIM 1732 that can be utilized as a device identifier for UE 1700. Firmware 1720 is also provided to store and provide to the processor 1702 startup and operational data. The UE 1700 can also include an image capture component 1722 such as a camera and/or a video decoder 1724 for decoding encoded multimedia content. Further, the UE 1700 can include a power source 1726 in the form of batteries, which power source 1726 interfaces to an external power system or charging equipment via a power I/O component 1728. In addition, the UE 1700 can include a softphone client 1730, which can be stored in memory 1704 and/or implemented by an application 1706. The softphone client is the same or substantially similar to softphone clients $114_1$-

114$_N$, and can include respective functionality, as more fully described herein, for example, with regard to system 400.

FIG. 18 illustrates a high-level block diagram that depicts an example LTE network architecture 1800 that can employ the disclosed communication architecture. The evolved RAN for LTE consists of an eNodeB (eNB) 1802 that can facilitate connection of MS 1804 to an evolved packet core (EPC) network. In one aspect, the MS 1804 is physical equipment or Mobile Equipment (ME), such as a mobile phone or a laptop computer that is used by mobile subscribers, with a Subscriber identity Module (SIM). The SIM is associated with a CTN, an International Mobile Subscriber Identity (IMSI), IMEI, and/or MSISDN, which is a unique identifier of a subscriber. The MS 1804 includes an embedded client that receives and processes messages received by the MS 1804. As an example, the embedded client can be implemented in JAVA. It is noted that MS 1804 can be substantially similar to UEs 112$_1$-121$_N$ and/or primary mobile device 110 and the like.

The connection of the MS 1804 to the evolved packet core (EPC) network is subsequent to an authentication, for example, a SIM-based authentication between the MS 1804 and the evolved packet core (EPC) network. In one aspect, the MME 1806 provides authentication of the MS 1804 by interacting with the HSS 1808. The HSS 1808 contains a subscriber profile and keeps track of which core network node is currently handling the subscriber. It also supports subscriber authentication and authorization functions (AAA). In networks with more than one HSS 1808, a subscriber location function provides information on the HSS 1808 that contains the profile of a given subscriber.

As an example, the eNB 1802 can host a PHYsical (PHY), Medium Access Control (MAC), Radio Link Control (RLC), and Packet Data Control Protocol (PDCP) layers that include the functionality of user-plane header-compression and encryption. In addition, the eNB 1802 can implement at least in part Radio Resource Control (RRC) functionality (e.g., radio resource management, admission control, scheduling, cell information broadcast, etc.). The eNB 1802 can be coupled to a serving gateway (SGW) 1810 that facilitates routing of user data packets and serves as a local mobility anchor for data bearers when the MS 1804 moves between eNBs. In addition, the SGW 1810 can act as an anchor for mobility between LTE and other 3GPP technologies (GPRS, UMTS, etc.). When MS 1804 is in an idle state, the SGW 1810 terminates a downlink (DL) data path and triggers paging when DL data arrives for the MS 1804. Further, the SGW 1810 can perform various administrative functions in the visited network such as collecting information for charging and lawful interception.

In one aspect, the SGW 1810 can be coupled to a Packet Data Network Gateway (PDN GW) 1812 that provides connectivity between the MS 1804 and external packet data networks such as IP service(s)/network(s) 1814. Moreover, the PDN GW 1812 is a point of exit and entry of traffic for the MS 1804. It is noted that the MS 1804 can have simultaneous connectivity with more than one PDN GW (not shown) for accessing multiple PDNs.

The PDN GW 1812 performs IP address allocation for the MS 1804, as well as QoS enforcement and implements flow-based charging according to rules from a Policy Control and Charging Rules Function (PCRF) 1816. The PCRF 1816 can facilitate policy control decision-making and control flow-based charging functionalities in a Policy Control Enforcement Function (PCEF), which resides in the PDN GW 1812. The PCRF 1816 can store data (e.g., QoS class identifier and/or bit rates) that facilitates QoS authorization of data flows within the PCEF. In one aspect, the PDN GW 1812 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1X and EvDO). Although a LTE network architecture 1800 is described and illustrated herein, it is noted that most any communication network architecture can be utilized to implement the disclosed embodiments.

Figure 19:
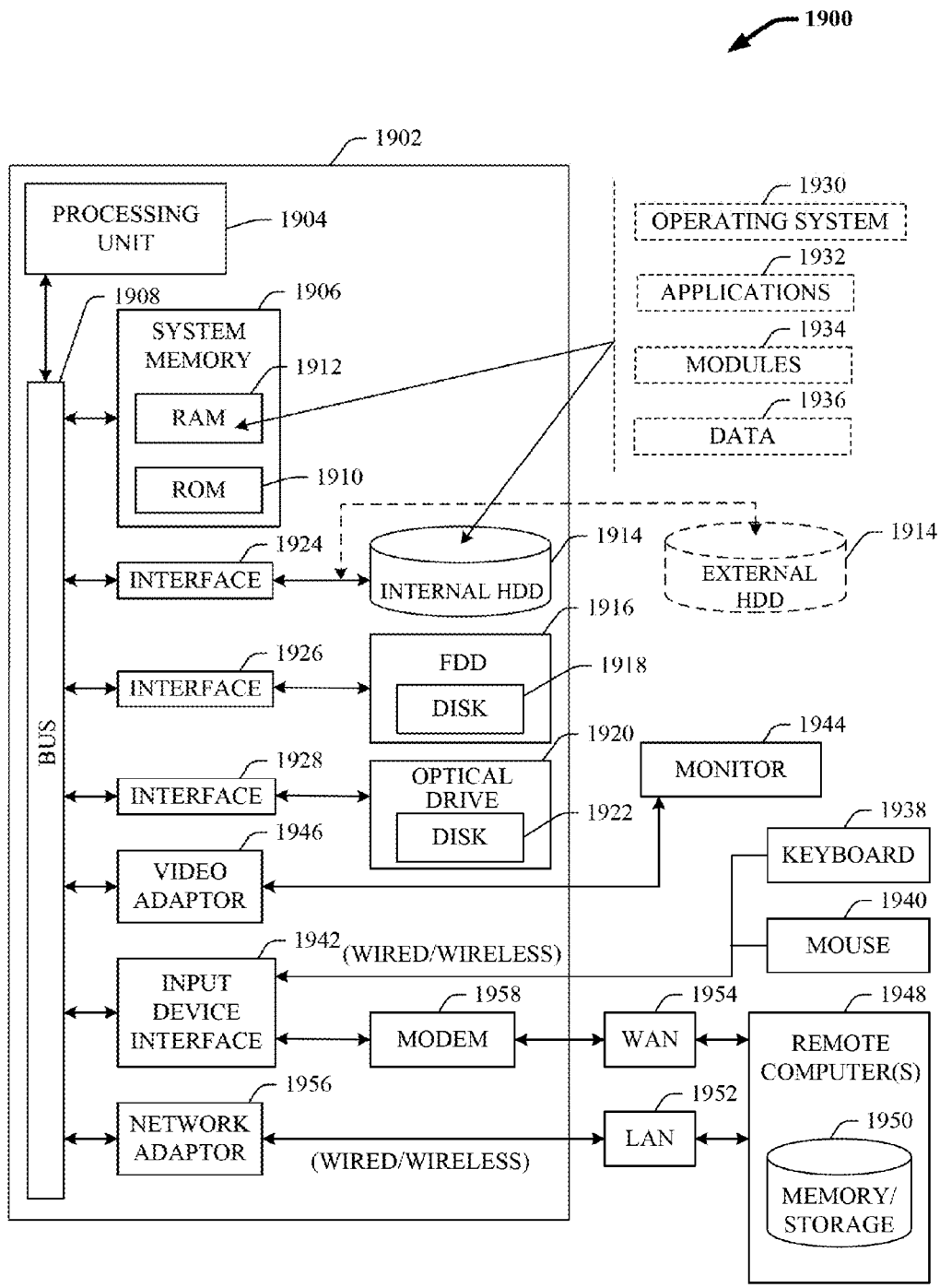
FIG. 19 illustrates a block diagram of a computer operable to execute the disclosed communication architecture.

Referring now to FIG. 19, there is illustrated a block diagram of a computer 1902 operable to execute the disclosed communication architecture. In order to provide additional context for various aspects of the disclosed subject matter, FIG. 19 and the following discussion are intended to provide a brief, general description of a suitable computing environment 1900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 19, the example environment 1900 for implementing various aspects of the specification includes a computer 1902, the computer 1902 including a processing unit 1904, a system memory 1906 and a system bus 1908. As an example, the component(s), server(s), equipment, system(s), and/or device(s) (e.g., UEs $112_1$-$112_N$, ASP 102, primary mobile device 110, softphone clients $114_1$-$114_N$, etc.) disclosed herein can each include at least a portion of the computer 1902. The system bus 1908 couples system components including, but not limited to, the system memory 1906 to the processing unit 1904. The processing unit 1904 can be any of various commercially available processors. Dual microprocessors and other multiprocessor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914, which internal hard disk drive 1914 can also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1994 interface technologies. Other external drive connection technologies are within contemplation of the subject disclosure.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is appreciated that the specification can be implemented with various commercially available operating systems or combinations of operating systems.

A user can enter commands and information into the computer 1902 through one or more wired/wireless input devices, e.g., a keyboard 1938 and/or a pointing device, such as a mouse 1940 or a touchscreen or touchpad (not illustrated). These and other input devices are often connected to the processing unit 1904 through an input device interface 1942 that is coupled to the system bus 1908, but can be connected by other interfaces, such as a parallel port, an IEEE 1994 serial port, a game port, a USB port, an infrared (IR) interface, etc. A monitor 1944 or other type of display device is also connected to the system bus 1908 via an interface, such as a video adapter 1946.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 is connected to the local network 1952 through a wired and/or wireless communication network interface or adapter 1956. The adapter 1956 can facilitate wired or wireless communication to the LAN 1952, which can also include a wireless access point disposed thereon for communicating with the wireless adapter 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are example and other means of establishing a communications link between the computers can be used.

The computer 1902 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A first device, comprising:
a processor; and
a memory that stores executable instructions comprising a softphone application that, when executed by the processor, facilitate performance of operations, comprising:
generating, via the softphone application, a session initiation protocol invite message that represents a request to switch a media session between a second device and a third device to be between the softphone application of the first device and the third device, wherein the session initiation protocol invite message comprises a first identifier for the softphone application, a second identifier for the second device and a device switch indicator; and
sending, via the softphone application, the session initiation protocol invite message to an application server device associated with a cellular service provider identity,
wherein the sending the session initiation protocol invite message initiates a switch of the media session from being between the second device and the third device to being between the softphone application of the first device and the third device as a function of the device switch indicator and based on a determination that the softphone application and the second device are associated with a common mobile subscriber identity registered for an account associated with the cellular service provider identity.

2. The first device of claim 1, wherein the softphone application and the second device are determined to be associated with the common mobile subscriber identity based on information associating the first identifier and the second identifier with the common mobile subscriber identity.

3. The first device of claim 1, wherein the first device is configured to employ the softphone application to conduct the media session using a voice over Internet protocol.

4. The first device of claim 1, wherein the second identifier comprises a uniform resource identifier for the second device.

5. The first device of claim 1, wherein the operations further comprise:
receiving, from the application server, an acceptance message indicating that the third device has accepted establishment of the media session with the softphone application of the first device and indicating that the second device has ended the media session with the third device; and
establishing, via the softphone application, the media session between the first device and the third device.

6. The first device of claim 1, wherein the second device comprises a mobile phone that is conducting the media session using a cellular communication protocol, and wherein the common mobile subscriber identity comprises a mobile station international subscriber directory number assigned to the mobile phone in association with the account associated with the cellular service provider identity.

7. The first device of claim 1, wherein the second device comprises a mobile phone that has established the media session using a cellular communication protocol, wherein the media session between the second device and the third device is suspended, and wherein the common mobile subscriber identity comprises a mobile station international subscriber directory number assigned to the mobile phone in association with the account associated with the cellular service provider identity.

8. The first device of claim 1, wherein the softphone application comprises a first softphone application and the second device comprises a second softphone application, wherein the second device performs the media session with the third device via the second softphone application using a voice over Internet protocol, wherein the second identifier identifies the second softphone application and wherein the determination that the first softphone application and the second device are associated with the common mobile subscriber identity is based on information associating the first identifier and the second identifier with the common mobile subscriber identity.

9. The first device of claim 8, wherein the device switch indicator comprises a pull command that represents a request to pull the media session from the second softphone application to the first softphone application.

10. The first device of claim 1, wherein the media session comprises voice data and video data.

11. A method comprising:
establishing, by a first device comprising a processor, a media session with a second device via a softphone application of the first device;
generating, by the first device via the softphone application, a session initiation protocol refer message that represents a request to switch the media session to be between the second device and a third device, wherein the session initiation protocol refer message comprises a first identifier for the softphone application, a second identifier for the third device, and a device switch indicator; and
sending, by the first device via the softphone application, the session initiation protocol refer message to an application server device associated with a cellular service provider identity,
wherein the sending the session initiation protocol refer message initiates a switch of the media session from being between the softphone application of the first device and the second device to being between the second device and the third device as a function of the device switch indicator and association of the softphone application and the third device with a common mobile subscriber identity registered for an account associated with the cellular service provider identity.

12. The method of claim 11, wherein the operations further comprise:
receiving, from the application server by the softphone application, an acceptance message originating from the third device indicating that the third device has accepted establishment of the media session with the second device;
ending, by the first device, the media session between the softphone application of the first device and the second device; and
sending, by the first device via the softphone application, a confirmation message to the application server indicating the ending of the media session between the softphone application of first device and the second device.

13. The method of claim 11, wherein the third device comprises a mobile phone configured to conduct the media session using a cellular communication protocol, and wherein the common mobile subscriber identity comprises a mobile station international subscriber directory number assigned to the mobile phone in association with the account associated with the cellular service provider identity.

14. The method of claim 11, wherein the softphone application comprises a first softphone application and the third device comprises a second softphone application configured to conduct the media session using a voice over Internet protocol, wherein the second identifier identifies the second softphone application and wherein the determination that the softphone application and the third device are associated with the common mobile subscriber identity is based on information associating the first identifier and the second identifier with the common mobile subscriber identity.

15. The method of claim 14, wherein the device switch indicator comprises a push command that represents a to push the media session from the first softphone application to the second softphone application.

16. A non-transitory machine-readable storage medium, comprising executable instructions that, when executed by a processor of a device, facilitate performance of operations, comprising:
receiving, from a softphone application of a first device, a session initiation protocol invite message that represents a to switch a media session between a second device and third device to be between the softphone application of the first device and the third device, wherein the session initiation protocol invite message comprises a first identifier for the softphone application, a second identifier for the second device, and a device switch indicator;
and
facilitating a switch of the media session from being between the second device and the third device to being between the softphone application of the first device and the third device as a function of the device switch indicator and based on association of the first identifier and the second identifier with a common mobile subscriber identity registered for an account associated with a cellular service provider identity.

17. The non-transitory machine-readable storage medium of claim 16, wherein the session initiation protocol invite message is a first session initiation protocol invite message, and wherein the facilitating the switch comprises:
  generating a second session initiation protocol invite message that invites the third device to establish the media session with the softphone application of the first device;
  sending the second session initiation protocol invite message to the third device;
  receiving an acceptance message from the third device confirming acceptance of establishment of the media session with the softphone application of the first device;
  sending a request to the second device to end the media session with the third device in response to the receiving the acceptance message; and
  receiving a confirmation message from the second device confirming ending of the media session with the third device.

18. The non-transitory machine-readable storage medium of claim 17, wherein the facilitating the switch further comprises:
  relaying the acceptance message from the third device to the softphone application of the first device in response to the receiving the confirmation message; and
  receiving, from the softphone application of the first device an acknowledgment message acknowledging establishment of the media session with the third device.

19. The non-transitory machine-readable storage medium of claim 16, wherein the softphone application comprises a first softphone application and the second device comprises a second softphone application, wherein the second device performs the media session with the third device via the second softphone application using a voice over Internet protocol, and wherein the second identifier identifies the second softphone application.

20. The non-transitory machine-readable storage medium of claim 16, wherein the facilitating the switch comprises sending a session initiation protocol re-invite message to that third device that invites the third device to re-establish the media session with the softphone application of the first device.

* * * * *